(12) United States Patent
Cooper

(10) Patent No.: US 7,469,237 B2
(45) Date of Patent: Dec. 23, 2008

(54) METHOD AND APPARATUS FOR FRACTAL COMPUTATION

(76) Inventor: David L. Cooper, 3634 W. Ox Rd., Fairfax, VA (US) 22033

(*) Notice: Subject to any disclaimer, the term of this patent is extended or adjusted under 35 U.S.C. 154(b) by 687 days.

(21) Appl. No.: 09/870,946

(22) Filed: Jun. 1, 2001

(65) Prior Publication Data

US 2002/0016782 A1 Feb. 7, 2002

Related U.S. Application Data

(63) Continuation-in-part of application No. 09/240,052, filed on Jan. 29, 1999, now Pat. No. 6,490,571, which is a continuation-in-part of application No. 08/713,470, filed on Sep. 13, 1996, now Pat. No. 6,009,418.

(60) Provisional application No. 60/016,707, filed on May 2, 1996.

(51) Int. Cl.
*G06N 5/00* (2006.01)
(52) U.S. Cl. .......................................... 706/15; 706/45
(58) Field of Classification Search .................. 706/12, 706/45, 25, 35, 39, 15; 382/143
See application file for complete search history.

(56) References Cited

U.S. PATENT DOCUMENTS

| | | | | |
|---|---|---|---|---|
| 3,275,986 A | 9/1966 | Dunn et al. | ............... | 340/146.3 |
| 3,950,733 A | 4/1976 | Cooper et al. | ............. | 340/172.5 |
| 4,440,243 A | 4/1984 | Howeth | ....................... | 175/209 |
| 4,852,018 A | 7/1989 | Grossberg et al. | ........... | 364/513 |
| 4,876,731 A | 10/1989 | Loris et al. | ..................... | 382/40 |
| 4,885,757 A | 12/1989 | Provence | ....................... | 375/96 |
| 4,896,053 A | 1/1990 | Kesselring | .................... | 307/201 |
| 4,941,193 A | 7/1990 | Barnsley et al. | ................ | 382/56 |
| 5,056,037 A * | 10/1991 | Eberhardt | ..................... | 706/39 |
| 5,065,447 A | 11/1991 | Barnsley et al. | ................ | 382/56 |
| 5,216,035 A | 6/1993 | Harrison et al. | ................ | 521/51 |
| 5,237,210 A * | 8/1993 | Castro | .......................... | 706/35 |
| 5,265,192 A | 11/1993 | McCormack | ................. | 395/22 |
| 5,299,285 A * | 3/1994 | Tawel | ........................... | 706/25 |
| 5,367,612 A | 11/1994 | Bozich et al. | ................... | 395/22 |
| 5,408,424 A * | 4/1995 | Lo | ................................ | 708/303 |
| 5,440,651 A | 8/1995 | Martin | ......................... | 382/156 |
| 5,517,596 A * | 5/1996 | Pechanek et al. | ............... | 706/25 |

(Continued)

OTHER PUBLICATIONS

Okabe, A. et al., "Spatial Tessellations: Concepts and Applications of Voronoi Diagrams," 2nd Ed. John Wily & Sons, Ltd., Table of Contents, pp. 1-3 and pp. 360-363, 2000.

Meester, Ronald et al., "Continuum Percolation," Cambridge Univ. Press, Table of Contents, pp. 209-217, 1996.

Davies, Paul, "The New Physics" Cambridge Univ. Press, Table of Contents, Chapter 11, pp. 316-347.

(Continued)

*Primary Examiner*—Wilbert L Starks, Jr.
(74) *Attorney, Agent, or Firm*—Greenberg Traurig LLP

(57) ABSTRACT

Fractal computers are neural network architectures that exploit the characteristics of fractal attractors to perform general computation. This disclosure explains neural network implementations for each of the critical components of computation: composition, minimalization, and recursion. It then describes the creation of fractal attractors within these implementations by means of selective amplification or inhibition of input signals, and it describes how to estimate critical parameters for each implementation by using results from studies of fractal percolation. These implementation provide standardizable implicit alternatives to traditional neural network designs. Consequently, fractal computers permit the exploitation of alternative technologies for computation based on dynamic systems with underlying fractal attractors.

91 Claims, 29 Drawing Sheets

U.S. PATENT DOCUMENTS

| | | |
|---|---|---|
| 5,536,947 A | 7/1996 | Klersey et al. .................. 257/3 |
| 5,602,964 A | 2/1997 | Barrett ......................... 395/24 |
| 5,698,089 A | 12/1997 | Lewis et al. .................. 205/787 |
| 5,706,404 A | 1/1998 | Colak ........................... 395/24 |
| 5,729,794 A | 3/1998 | Schwallie et al. ............ 399/106 |
| 5,748,742 A | 5/1998 | Tisdale et al. .................. 380/49 |
| 5,805,832 A | 9/1998 | Brown et al. .................. 395/752 |
| 5,940,794 A | 8/1999 | Abe ............................ 704/253 |
| 6,009,418 A | 12/1999 | Cooper ......................... 706/15 |
| 6,047,277 A | 4/2000 | Parry et al. .................... 706/20 |
| 6,052,485 A | 4/2000 | Nelson et al. ................ 382/225 |
| 6,081,750 A | 6/2000 | Hoffberg et al. .............. 700/17 |
| 6,142,681 A | 11/2000 | Gulati ......................... 395/13 |
| 6,151,573 A | 11/2000 | Gong ......................... 704/256 |
| 6,167,155 A | 12/2000 | Kostrzewski et al. ........ 382/232 |

OTHER PUBLICATIONS

Leuenberger, Michael N. et al., Letters to Nature, "Quantum Computing in Molecular Magnets," *Nature Magazine*, vol. 410, Issue 6830 Apr. 12, 2001, pp. 789-793.

Falconer, Kenneth, "Fractal Geometry," John Wiley & Sons, Table of Contents, pp. 230-235, 1990.

Cooper, David L., "Linguistic Attractors", John Benjamins Publishing Company, Table of Contents, Chapter 2, pp. 47-89, Chapter 5, pp. 137-203, 1999.

* cited by examiner

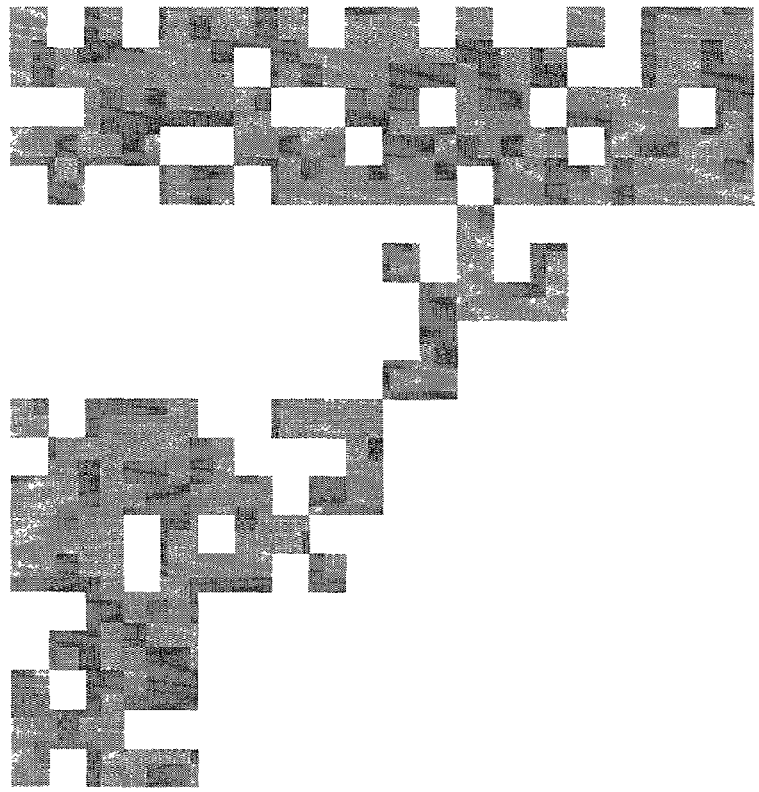
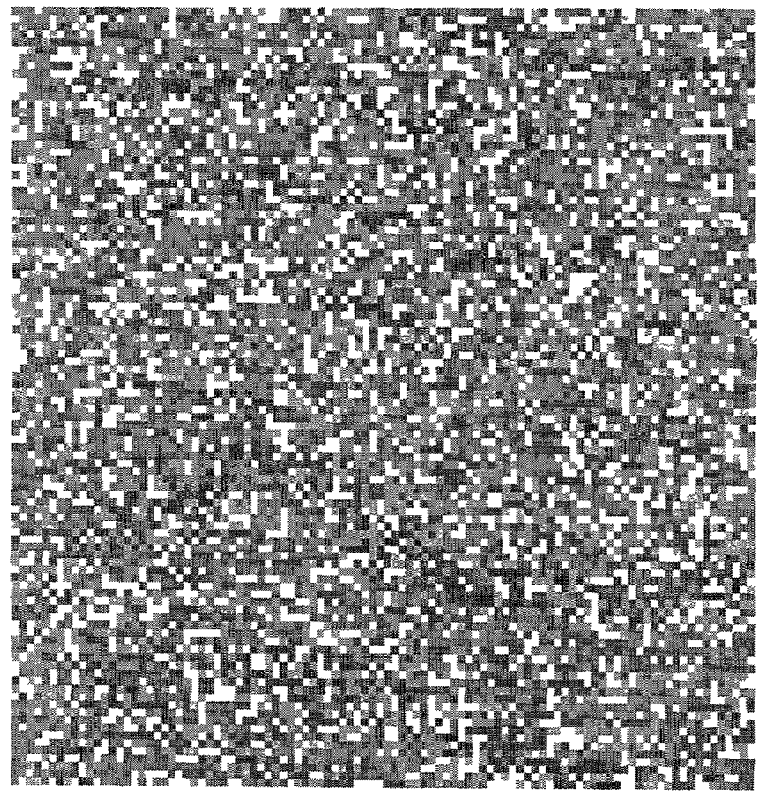
Figure 2

Figure 15
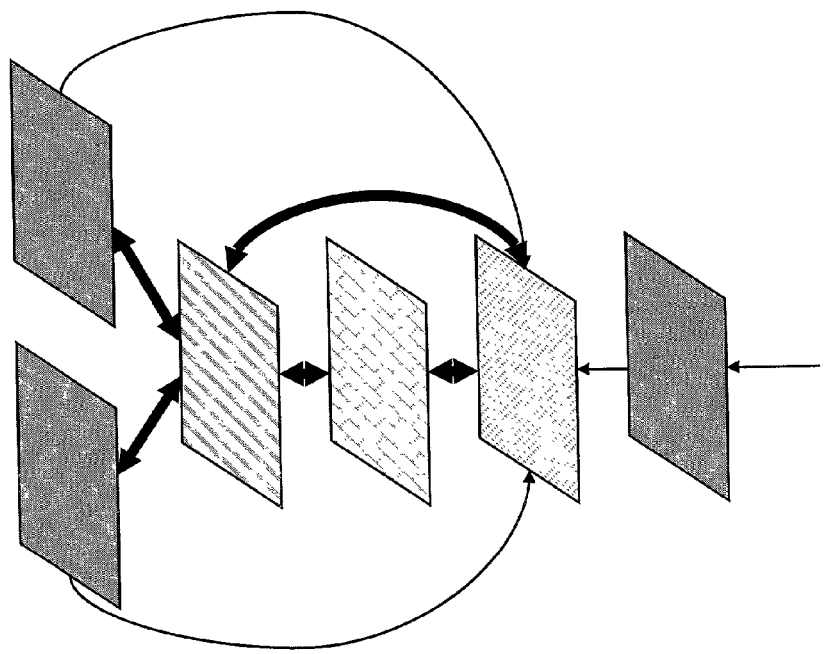
15B. 3-Layer Processing;
Bidirectional Output
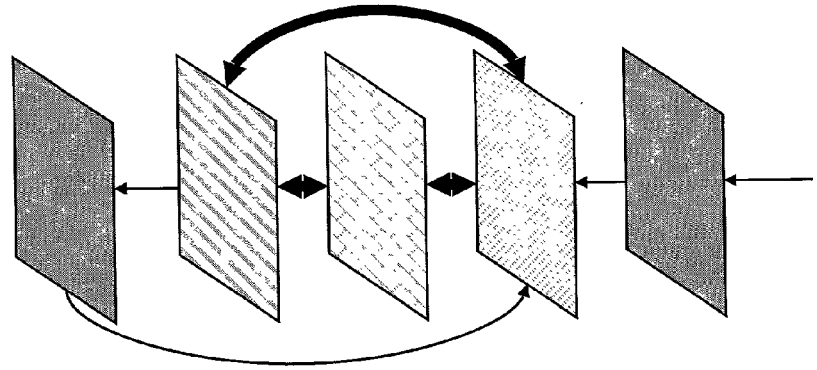
15A. 3-Layer Processing;
Feedforward Output

METHOD AND APPARATUS FOR FRACTAL COMPUTATION

This Application is a Continuation-In-Part of U.S. patent application Ser. No. 09/240,052, filed Jan. 29, 1999, now U.S. Pat. No. 6,490,571 which is a Continuation-In-Part of U.S. patent application Ser. No. 08/713,470, filed Sep. 13, 1996, now issued as U.S. Pat. No. 6,009,418, which claims the benefit of U.S. Provisional Patent Application Ser. No. 60/016,707 filed May 2, 1996. The entire disclosures of these applications, including references incorporated therein, are incorporated herein by reference.

BACKGROUND OF THE INVENTION

1. Field of the Invention

The invention relates in general to the field of neural networks, and more particularly, to implicit general computation by means of digital applications or by means of dynamic systems with underlying fractal attractors.

2. Description of the Related Art

Neural networks of some description have been discussed in open literature since the 1960's. A few related patents (e.g., Dunn et al., U.S. Pat. No. 3,275,986) date from that period. Despite much progress on the creation of distributed memory, robust function and pattern recognition, early work was largely abandoned after Marvin Minsky's famous attack on the Perceptron, which he showed to be incapable of the "exclusive or" (XOR) logical function. Interest in this type of computation device revived after the discovery that the XOR limitation could be overcome by adding additional layers to the Perceptron architecture, sometimes called "hidden" layers.

In the past 25 years, the U.S. has issued more than 4,000 patents for, or including components of, neural networks. The first of these (Cooper et al., U.S. Pat. No. 3,950,733, and Cooper et al., U.S. Pat. No. 4,044,243), a three layer design, claimed adaptive information processing modules that mapped N input values to n output values, and thus involved neural networks performing general computation functions. However, since that time, only 11 percent of the U.S. patents related to neural networks concern general computation or generalized computational functions. More than 80 percent focus on specific applications employed on particular functions. Typically, these applications involve some kind of dynamic control (e.g., Grossberg et al., U.S. Pat. No. 4,852,018), pattern recognition (e.g., Loris et al., U.S. Pat. No. 4,876,731), or image or signal processing (e.g., Provence, U.S. Pat. No. 4,885,757). The remaining patents concern components used in neural networks, either for general computation, or for specific applications (e.g., Kesselring, U.S. Pat. No. 4,896,053).

Neural networks that perform either generalized or applied functions share a number of common traits, notably an architecture of computational nodes arrayed into one or more layers, connection weights, learning rules, and procedures to adjust parameters to expedite the learning process. More than 90 percent of these designs are supervised, meaning that the design requires a formal training phase where output values are "clamped" to a training set of data. Perceptrons provide an early example of such supervised networks and still provide useful applications (e.g., Adler, U.S. Pat. No. 5,261,035). Perceptrons alone comprise more than 10 percent of the patented designs since 1976.

More than one third of all neural network design abstracts describe the use of backpropagation procedures. These provide an example of explicit computation in neural network functions, as backpropagation consists of employing the execution of an optimization algorithm to adjust the weights in a neural network architecture as the network is trained (e.g., Martin, U.S. Pat. No. 5,440,651).

Backpropagation differs from feedback, which is simply the provision of inputs from other portions of an architecture, or from the environment. Backpropagation differs fundamentally from implicit computation, which occurs in networks that employ local rules to accomplish their tasks. Explicit computation in this sense describes the use of an external calculation to further the functioning of a network. The network in effect provides a framework in which the calculations, such as multi-variate Taylor expansions in the Cooper et al., designs above, are completed. Implicit computation does not need such external calculations. The contrast between implicit and explicit computation is quite similar to the distinction between simulation and emulation of dynamic systems discussed in David L. Cooper, *Linguistic Attractors*, Chapter 2 (1999): a simulation attempts to capture important aspects of dynamics, while an emulation attempts to match results without reference to internal dynamics (essentially a "black box" approach).

Two important classes of neural networks that normally rely on explicit calculation are the hidden Markov models and simulated annealing models. Hidden Markov models employ calculations based on a selected probability distribution to adjust the network as it trains. These distributions are stationary, that is, the probability of an event is the same at time t as at time $t+\Delta t$. For example, Brown et al., U.S. Pat. No. 5,805,832, uses a hidden Markov step and a Poisson distribution for some applications. Abe, U.S. Pat. No. 5,940,794, includes a hidden Markov step and mentions the gamma distribution in one embodiment (the gamma distribution corresponds to the distribution of waiting times for Poisson processes). Gong, U.S. Pat. No. 6,151,573, uses a hidden Markov step with combinations of Gaussian (normal) distributions. Hidden Markov models account for more than 9 percent of the U.S. patents issued in the past quarter century.

Simulated annealing designs (e.g., Leuenberger, U.S. Pat. No. 6,100,989)—at least another 6 percent of issued U.S. patents—are particularly suited to explicit calculation, as such designs incorporate a "temperature" parameter that adjusts the speed at which components change their weights. These are typically also associated with another probability distribution for which temperature is an important parameter: this is the Boltzmann distribution, which allows such designs to emulate thermodynamic systems. Implicit versions of simulated annealing are possible, for example, Alspector, U.S. Pat. No. 4,874,963, implements the Boltzmann distribution with semi-conductor circuits, and uses a source of noise to adjust the "temperature" parameter.

Synthetic evolutionary designs comprise another 9 percent of issued U.S. patents. These (e.g. Parry et al., U.S. Pat. No. 6,047,277) use a version of a "genetic algorithm" to produce random outputs, and then cull the outputs according to some metric. For example, Altshuler et al., U.S. Pat. No. 5,729,794 uses such an algorithm to produce antenna designs, where computer estimates of antenna characteristics are weighed against a set of desired characteristics.

While neural network designs requiring explicit computation are very common, implicit designs, such as Alspector's cited above, are rare. Cooper, U.S. Pat. No. 6,009,418, to which this application claims priority, is a clear example of this kind of design. It discloses an architecture that permits self-adjusting channels which already provides at least 26 percent improvement in digital simulations over other designs on deeply-nested dependency problems. It also incorporates learning rules based on non-stationary processes that permit non-digital implementations through dynamic systems characterized by such non-stationary processes, such as systems described by Bose-Einstein statistics. Finally, it discloses a network design that can exploit the capability of fractal sets to encode and process information.

The present disclosure, in expanding on Cooper, U.S. Pat. No. 6,009,418, employs three key concepts that do not appear elsewhere in the prior art in the senses meant here: fractal sets, renormalization, and percolation. In the prior art, these terms are used in the following manner.

Except in Cooper, U.S. Pat. No. 6,009,418, "fractal" appears in three principal senses: as a method for data compression (e.g., Hoffberg et al., U.S. Pat. No. 6,081,750), in the related sense in which it appears as an alternative method to re-construct a figure (e.g., Kostrzewski et al., U.S. Pat. No. 6,167,155), and as a physical description, particularly as a texture (e.g., Nelson et al., U.S. Pat. No. 6,052,485).

"Renormalization" occurs in the sense of a calculation step to bring values back into a specified range or re-scaling it (e.g., Gulati, U.S. Pat. No. 6,142,681 and McCormack, U.S. Pat. No. 5,265,192). In a minor exception, Barrett, U.S. Pat. No. 5,602,964, notes that the disclosed process involving Liapunov exponents in that patent is "compatible" with renormalization group methods from statistical physics. Such methods are normally employed to derive gauge invariance in various systems.

"Percolation" occurs most often as a parameter a given design can compute as part of its output (e.g., Lewis et al., U.S. Pat. No. 5,698,089). Bozich et al., U.S. Pat. No. 5,367,612 uses "back percolation" in the sense of backpropagation. Colak, U.S. Pat. No. 5,706,404, discloses a network design that uses inhomogeneities in a medium to transmit input signals as unchannelled waves. Colak comes closer to the sense employed in the present disclosure but stops short by using the percolation concept simply as a way to understand the process in that disclosure. The disclosure notes, for example, that there is no sharp cut-off in current such as a real percolation model would predict. Klersy et al., U.S. Pat. No. 5,536,947 describes a memory device that employs a material that changes back and forth between amorphous and crystalline states to store and retrieve information. They note that percolation takes place across the material in these switches. While memory is an important component to general computation, this disclosure does not take the next step and describe how such a process can be used to perform computations in general.

SUMMARY OF THE INVENTION

Accordingly, the present invention is directed to a method and apparatus for fractal computation that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in one aspect of the present invention there is provided a method for computation using a neural network architecture including the steps of using a plurality of layers, each layer including a plurality of computational nodes, an input processing layer, a central processing layer, and an output processing layer; using at least one feedforward channel for inputs, using full lateral and feedback connections within the processing layers, using an output channel for outputs, using re-entrant feedback from the output channel to at least one of the processing layers, using local update processes to update each of the plurality of computational nodes, and using re-entrant feedback from the output channel to perform minimalization for general computation.

In another aspect of the present invention there is provided a apparatus for implicit computation including neural network architecture means having a plurality of layer means, each layer means including a plurality of adaptive computational node means, the plurality of layer means further including processing layer means including input processing layer means, central processing layer means, and output processing layer means, feedforward input channel means, full lateral and feedback connection means within the processing layer means, output channel means, re-entrant feedback means from the output channel means to the processing layer means, means for updating each of the plurality of adaptive computational node means using local update processes, and means for using re-entrant feedback from the output channel means to perform minimalization for general computation.

In another aspect of the present invention there is provided an apparatus for implicit computation including neural network architecture means including input means from an environment, and output means a plurality of locally connected computation node means for fractal percolation, wherein a minimalization step is used for computation.

It is to be understood that both the foregoing general description and the following detailed description are exemplary and explanatory and are intended to provide further explanation of the invention as claimed.

BRIEF DESCRIPTION OF THE ATTACHED DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

In the drawings:

FIG. 2 illustrates a second and third steps in a construction of a top-down fractal percolation model (right) on a field of random inputs (left), with the probability of survival at each step set at $\tfrac{2}{3}$;

FIG. 15a illustrates a schematic layer view of a 3-layer processing channel with feedforward output and feedback;

FIG. 15b illustrates a schematic layer view of a 3-layer processing channel with bi-directional output channels and feedback;

DETAILED DESCRIPTION OF THE PREFERRED EMDODIMENTS

Figure 1:
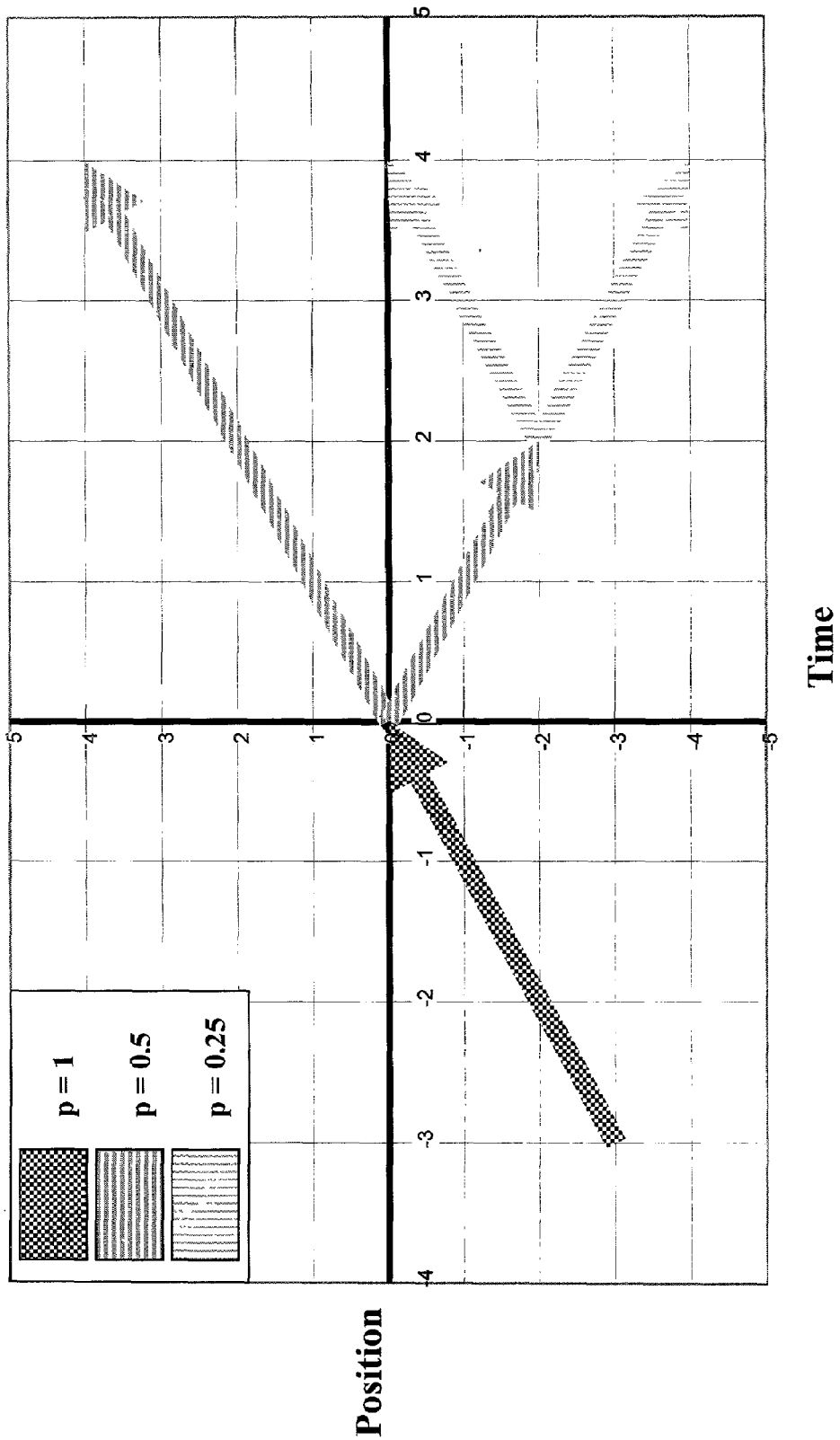
FIG. 1 illustrates a state space for a trajectory along a number line.

Reference will now be made in detail to the preferred embodiments of the present invention, examples of which are illustrated in the accompanying drawings.

In a preferred embodiment, fractal computation is performed using a neural network architecture and learning rules derived from the study of dynamic systems, fractal percolation, and theory of general computation. Standardized components permit the storage, processing, and retrieval of information. The invention permits rapid, unsupervised processing of complex data sets, such as imagery, databases, textual files, or continuous human speech.

The standardized components of this invention, according to a preferred embodiment, include converging feedforward input channels, interlinked self-adjusting converging and diverging central processing channels, and output channels for processing execution instructions and for feedback. Learning rules are based on localized reinforcement of successes, as well as random or rule-driven inhibition. The learning rules incorporate features of non-stationary statistical processes such as Polya processes, Bose-Einstein statistical processes, phase transitions, or nearest-neighbor renormalization. These non-stationary processes provide the basis for computational non-linearities in digital applications, and for exploitation of new technologies based upon dynamic systems with underlying fractal attractors.

The term "fractal" was coined by Benoit Mandelbrot, who consciously avoided a fully rigorous definition of the term. For the purposes of this disclosure, and consistent with his discussion of the concept, a fractal is any set for which the Hausdorff dimension is greater than or equal to the topological dimension. Scaling or self-similar fractals form an important subset, which, when incorporated into iterated function systems, provide the basis for efficient data compression and decompression (see, for example, Barnsley et al., U.S. Pat. Nos. 4,941,1931, 5,065,4471, and 5,347,600, and Barnsley, U.S. Pat. No. 5,748,742). However, the feature which makes iterated function systems ideal for data compression—high predictability—makes them unsuitable for computation, which requires encoding and manipulation of information. In fact, information which distinguishes one set from another is contained in a "residue" left over after iterated function systems have been employed to compress the data in the sets. For computation, this "residue" is often the most important component.

From the theory of Turing Machines, we know that computation can be broken into three essential components: composition, minimalization, and recursion. Composition associates with functions $f(n^m)$, $g_1(r'')$, $g_2(r'')$, $g_3(r'')$, ..., $g_m(r'')$ the function $h(r'')=f\lfloor g_1(r''), g_2(r''), \ldots, g_m(r'')\rfloor$ where $(a_1, \ldots, a_n)$ is in the domain of each $g_i(r'')$ $i=1,2,\ldots,m$, and $\lfloor g_1(a_1, \ldots, a_n), g_2(a_1, \ldots, a_n), \ldots, g_m(a_1, \ldots, a_n)\rfloor$ is in the domain of $f(n^m)$. The value of $h(r'')$ at $(a_1, \ldots, a_n)$ is $f\lfloor g_1(a_1, \ldots, a_n), g_2(a_1, \ldots, a_n), \ldots, g_m(a_1, \ldots, a_n)\rfloor$.

Minimalization associates with each $f(y, r'')$ the function $h(r'')$ whose value for a given $r''$ is the least value of y, if it exists, for which $f(y, r'')=0$, and is undefined if it does not exist.

$$h(r'')=\min_y[f(y, r'')=0]$$

Recursion is the repeated application of composition and minimalization.

The present invention permits dynamic computation on neural networks. Composition is assured by forward connectivity. Inputs are then automatically contained in any computation performed by any layer in the network. Recursion is assured by feedback. Minimalization is the non-trivial component in neural network computation. Most neural network designs rely on external computation to accomplish this step, particularly standard backpropagation designs, hidden Markov models, and so forth. Self-organizing designs, such as the Kohonen Quantum Learning Vectorization design (U.S. Pat. No. 5,428,644), employ an external computation to calculate the optimum value required by minimalization. Simulated annealing designs also rely on external computation, both of the local minimum or maximum, and for the artificial temperature parameter. The Semantic Attractor Architecture (U.S. Pat. No. 6,009,418) accomplishes this step implicitly, relying on the characteristics of non-stationary dynamic processes. Of course, as is well known by those versed in the art, the Semantic Attractor Architecture can be simulated with digital representations of these processes as well.

Prior to assigning channel structures or unique characteristics at selected nodes, a neural network can be viewed as a lattice. Assume such a lattice of arbitrary area per layer and an arbitrary number of layers. Successful processes across the lattice can be viewed as a bond or site percolation process. For example, composition without recursion (feedforward) is equivalent to an oriented bond percolation setup across a network's layers. Bond percolation across lattices has a critical probability $p_c$ such that a cluster is almost surely finite sized when $p<p_c$ and almost surely infinite and unique when $p>p_c$. For oriented percolation across lattices of dimension d, $$p_c(d) \sim d^{-1}$$

With recursion, the dimension of the lattice is effectively infinite, unless truncated. Consider a trajectory from $-\infty$ to $\infty$ on a number line. The state space for this trajectory obviously requires 1 dimension, the number line itself. If the equivalent of a half-mirror is placed at the origin, however, where the trajectory continues with probability ½ or reverses with probability ½, the state space requires 2 dimensions to keep track of the potential location of the process on the number line. This corresponds to a single feedback link. To complete the feedback link as a recursive link, a second half-mirror is needed (assume for simplicity that the half-mirror is transparent from the left). The second mirror requires a third dimension to portray leftward trajectories, illustrated at FIG. 1, but an infinite number of additive dimensions to portray oscillation between the half-mirrors, as well as the additional left and right trajectories. Thus, recursion, unless truncated by a time threshold, a limitation on iterations, or a decay process, leads to a lattice of infinite dimension. This effect carries forward as the line is replaced with planes (layers), and as recursion loops are incorporated into the network architecture.

Davis, *The New Physics* (1989), see pages 316-348, and particularly page 339, incorporated by reference herein, associates the time-dependent behavior of a self-organizing system with a macroscopic rate law and a deviation from a Poisson rate law. Prior to learning, a neural network represents a Poisson system with percolation probability $\gamma(\lambda)$ defined by $\gamma(\lambda)=P^\lambda(|W|=\infty)$ where $\lambda$ is the intensity of the Poisson process. There is a critical intensity $\lambda_c$ such that $$\gamma(\lambda) = \begin{cases} = 0 & \text{if } \lambda < \lambda_c \\ > 0 & \text{if } \lambda > \lambda_c \end{cases}$$

and the mean cluster size is $E^\lambda(|W|)$ is finite when $\lambda<\lambda_c$. In fact, $$\zeta(\lambda) = \lim_{n\to\infty}\left\{-\frac{1}{n}\log P^\lambda(|W|=n)\right\}$$

exists and is strictly positive for $0<\lambda<\lambda_c$. For $\gamma(\lambda)>0$ there is almost surely a unique infinite cluster of overlapping spheres. The probability that any given vertex is open is given by $$p_n(\lambda) = P^\lambda(\text{no point in ball } B_n(0))$$
$$= 1 - \exp(-\lambda n^{-d})$$

where $$B_n(x) = \prod_{i=1}^{d}\left[x_i - \frac{1}{2n}, x_i + \frac{1}{2n}\right) \text{ for } x \in Z_n^d$$

Moreover, the critical probability $$\lambda_c \geq -n^d \log\{1-p_c(L_n)\}$$

for lattice L with n nodes and d dimensions.

Figure 3:
FIG. 3 illustrates a remnant of the model in FIG. 2 after three steps.

FIGS. 2 through 5 help to illustrate some of these points. FIG. 2 depicts two 100×100 pixel squares, with the square on the left consisting of a set of random inputs and the square on the right consisting of the remnant of those random numbers after three Poisson processes have been superimposed. The gray scale values in the left-hand square of random numbers go from white for probabilities between 0 and 0.25 in three additional steps of increasing gray values until the darkest gray shows probabilities between 0.75 and 1. To derive the right-hand figure from these values, three Poisson steps were superimposed, beginning with survival of probabilities greater than ⅓ on 25×25 pixel squares, then survival of probabilities greater than ⅓ on 5×5 pixels, and finally survival of probabilities greater than ⅓ on 3×3 pixel squares. The final two steps are depicted with black for the second step, and gray superimposed for the third. FIG. 3 shows the remnant surviving after the third step. These steps are typical for the construction of fractal sets in the mathematical literature, as in Falconer, *Fractal Geometry* (1990), see pages 231-235, and Meester and Roy, *Continuum Percolation* (1996), at pages 209-216, both incorporated by reference herein. Clearly p=⅔ is less than the critical probability for these processes.

Figure 4:
FIG. 4 illustrates the remnant of a similar model after three steps when a probability of survival at each step is set at 0.85.
Figure 5:
FIG. 5 illustrates a remnant of the set in FIG. 4 after two additional steps.

FIG. 4 illustrates the remnant of a similar model after three steps when the probability of survival at each step is set at 0.85. FIG. 5 illustrates the remnant of the set in FIG. 4 after two additional steps, which are applied successively to 2×2 pixel squares, and finally to single pixels. In this case, percolation occurs from top to bottom, and nearly also occurs from left to right. This means that the critical probability for this set of inputs and these Poisson processes is close to 0.85.

Learning necessarily departs from the Poisson law, as the Poisson process only obtains to the point were the network's connection values are adjusted for success or failure. Derivation of the minimalization step is thus related to the macroscopic rate law required by Nicolis and Prigogine. (See Davis, *The New Physics,* pages 316-348.)

FIGS. 6 through 12 illustrate how implicit normalization can be used to accomplish this, and further demonstrate how construction of fractal sets on neural network lattices can accomplish computation.

Implicit normalization occurs when nodes behave in accordance with the behavior of the $\Gamma$ nearest neighbors. In general, for a lattice with dimension d, N sites, and $\Gamma$ nearest neighbors, the lattice is divided into blocks of length $L_a$, with a being the separation of the original lattice. Choose L so that $L_a \ll \xi, \xi$ being the correlation length of the lattice. The total number of nodes per block is $L^d$. The total number of blocks is $NL^{-d}$. The total on/off states in a Boolean block I is $$S'_I = \sum_{i \in I} S_i$$

This can be expressed as a new variable $$S'_I = ZS_{I \text{ with } Si} \pm 1 Z = L^y$$

Channels in a neural network architecture with standardized structures would be distinguished by their inputs and the intensity $\lambda_c$ of the underlying Poisson process within the channel. When a solution develops in the channel, the path is unique. Updated connection or activation rates make the path more likely for identical inputs, up to $p=\lambda_c$.

Figure 6:
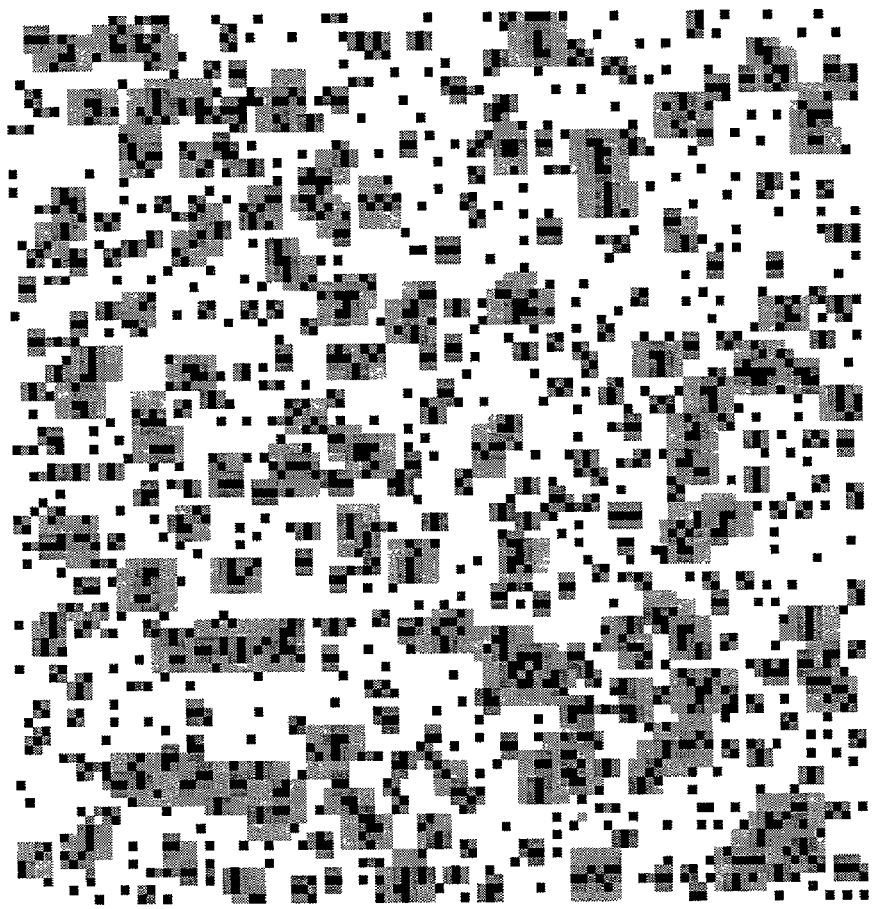
FIG. 6 illustrates a first three steps in a bottom-up process based on the same field of random inputs in FIG. 2, with the seed set based on a probability of selection of 0.15.

For an example in two dimensions, FIG. 6 illustrates the first three steps in a bottom-up process based on the same field of random inputs in FIG. 2. The seed set is based on a probability of selection of 0.15, the converse of the top-down probability of 0.85 used for FIGS. 2 through 5. The steps used in FIG. 6 consist of completing any squares when two elements of the square are already occupied. The first step completes 2×2 squares, the second step completes 4×4 squares of the resultants of the first step, and the third step completes 6×6 squares using the new resultants.

Figure 7:
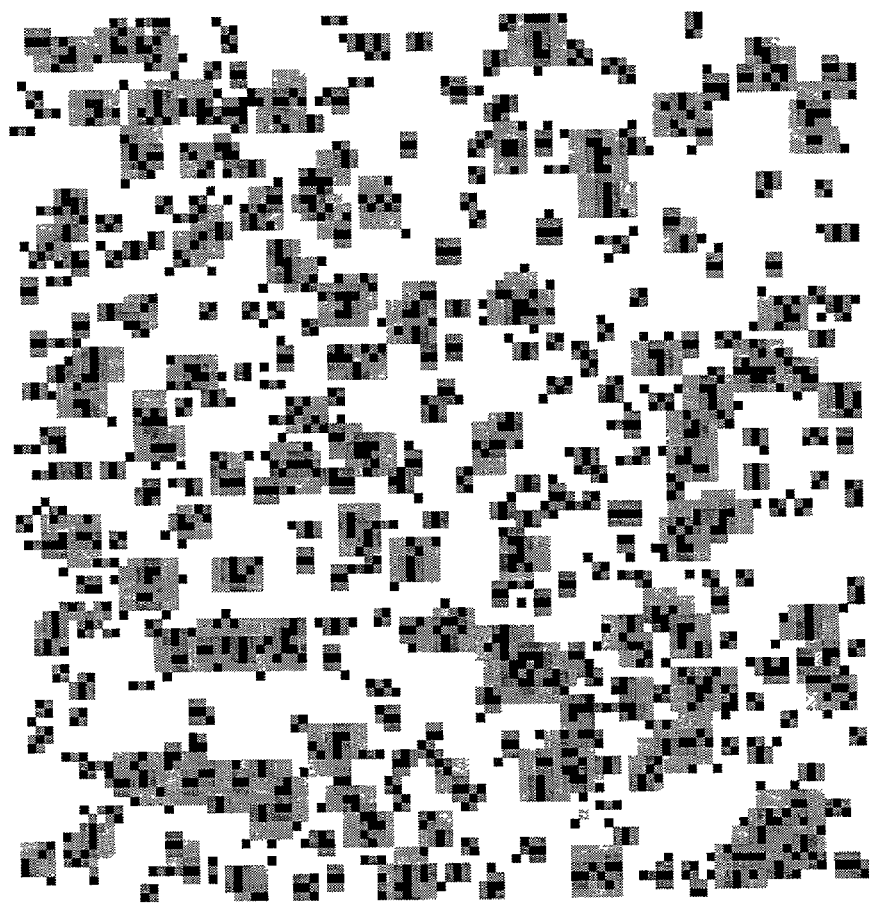
FIG. 7 illustrates a set in FIG. 6 after rule-driven extinction of elements not supported by the bottom-up percolation process.

For a further departure from the underlying random inputs and any Poisson process, FIG. 7 illustrates the set in FIG. 6 after the extinction of elements not supported by the bottom-up percolation process. Here, the elements were not supported whenever they were no greater than one pixel wide. This corresponds to local inhibition conditions often encountered in biological neural networks.

Figure 8:
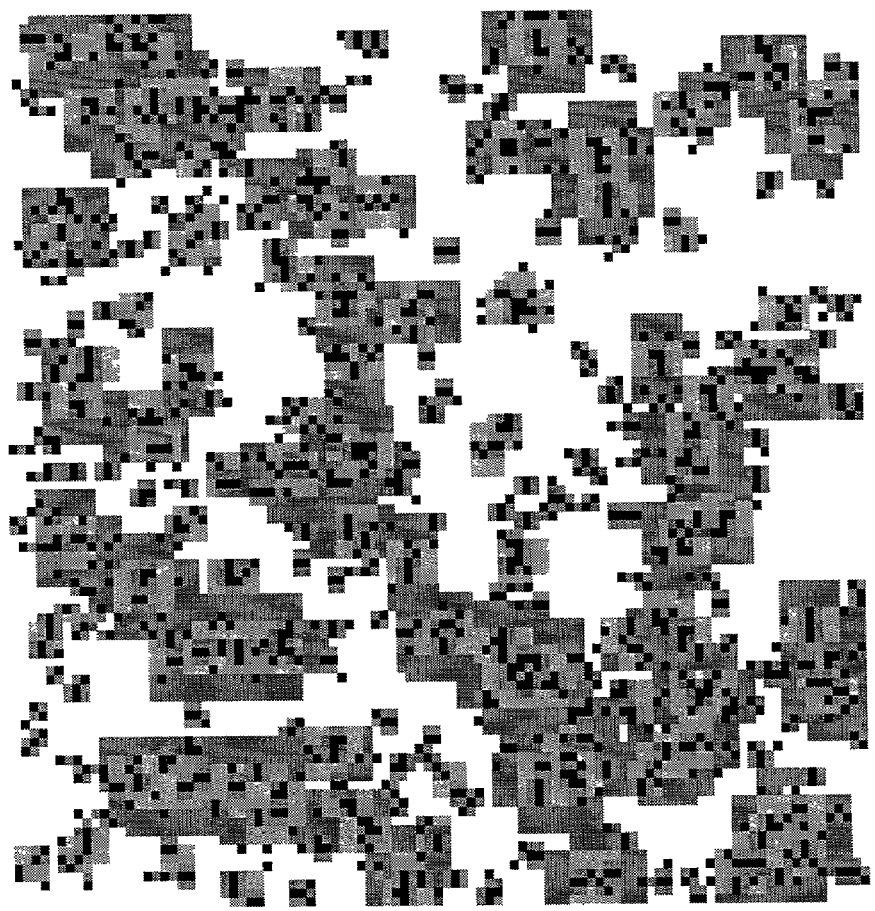
FIG. 8 illustrates a result of an additional bottom-up step for a set in FIG. 7 after an additional extinction step.

FIG. 8 illustrates the result of an additional bottom-up step for the set in FIG. 7 after an additional extinction step. Here the squares to be completed were 8×8 pixels, and extinction removed any elements less than two pixels wide.

Figure 9:
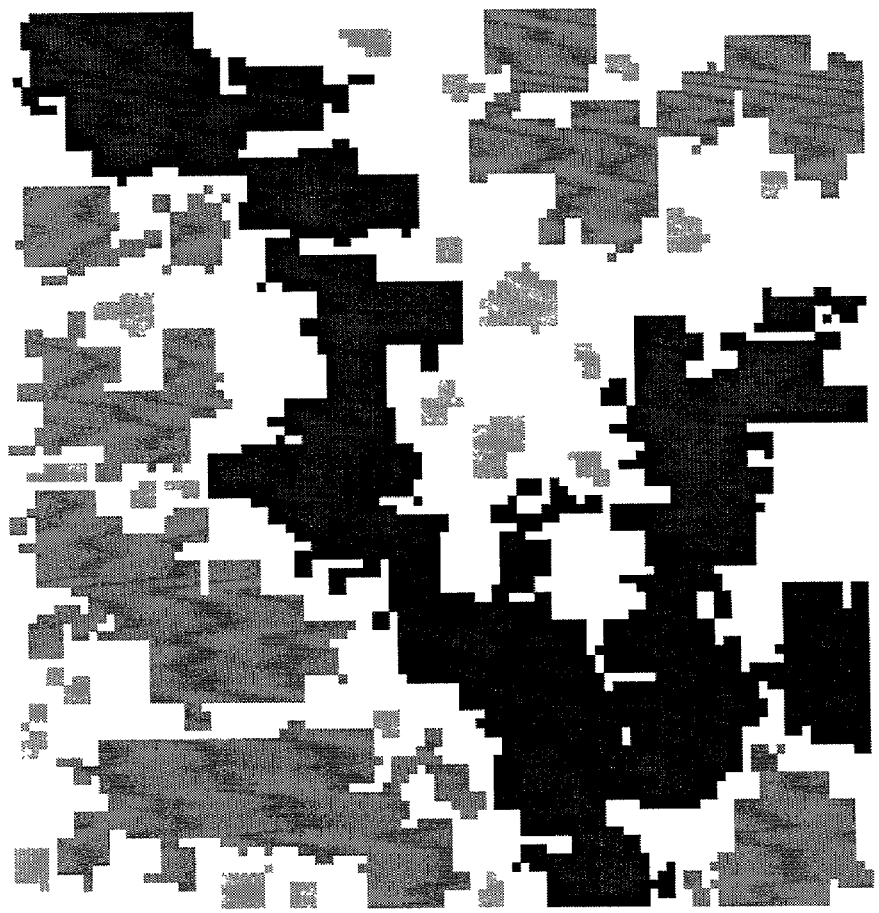
FIG. 9 illustrates a result of feedback-driven rectification of the a in FIG. 8.

FIG. 9 illustrates the result of feedback-driven rectification of the set in FIG. 8. By contrast to local inhibition, this corresponds to larger scale adjustments to network values, and thus requires feedback from later stages in processing. In FIG. 9, the adjustments transformed the underlying random values from x to $\tanh(2x)$ for the percolating elements, retained the values for x for the larger "islands," reduced the values for x to $\tanh(x)$ for the smaller "islands," and reduced the remaining values from x to $\tanh(x/2)$. This simply introduces the non-linear adjustments to inter-nodal weights familiar to those versed in the art. In Boolean form, however, this step corresponds to the creation of an AND-NOT (NAND) gate, known to be sufficient for conventional computation when used in combination with other NAND gates.

Quantum computers can be built out of controlled-NOT (CNOT) gates. Percolation in a quantum context is an interesting area to explore, as many percolation studies involve atomic or molecular spin orientations, and percolation phenomena related to "Ising glasses." Spin orientations are quantum phenomena, and they can be manipulated in such simulations or experiments by use of radiation or the manipulation of the temperature. Leuenberger & Loss, Quantum Computing in Molecular Magnets, in *Nature*, vol. 410 (2001), pages 789-793, incorporated by a reference herein, disclose molecular magnets capable of dynamic random access memory, where the magnets are prepared and read out by multifrequency coherent magnetic radiation in the microwave and radio-frequency range. This article employs Grover's algorithm for quantum search of a database. As mentioned elsewhere in the present disclosure, memory is an important component of computation. The composition steps necessary for general computation in this case can be applied through manipulation of the signals that prepare network, much like the preparation in Leuenberger & Loss. Minimalization would occur at the read out step.

Figure 10:
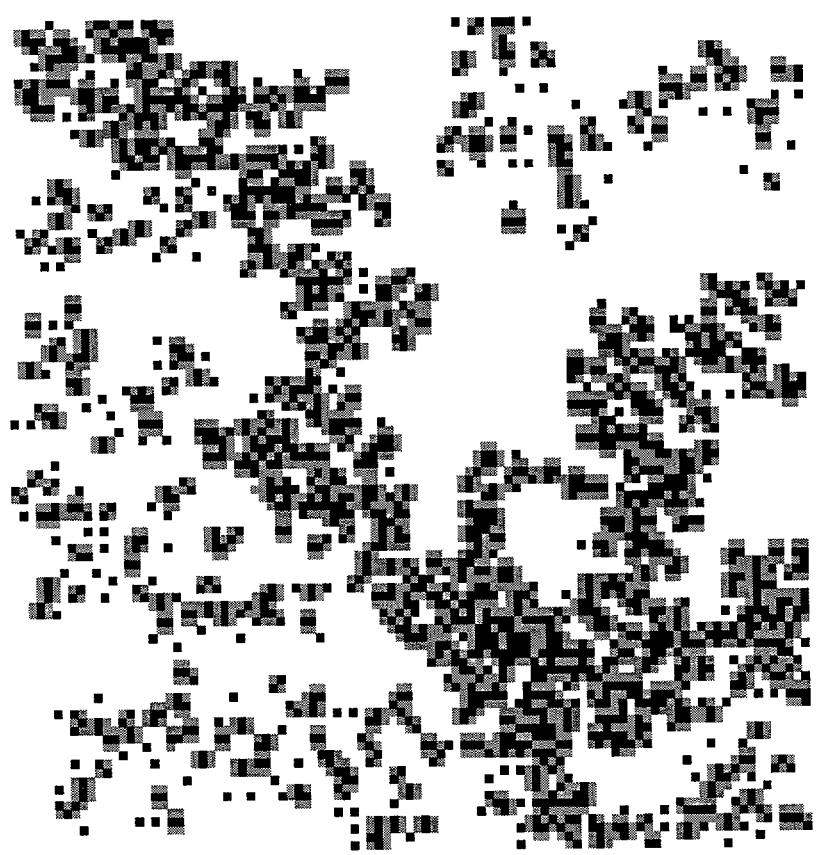
FIG. 10 illustrates first two steps in a second bottom-up cycle for remnants in FIG. 9.

FIG. 10 illustrates the first two steps in a second bottom-up cycle for the remnants in FIG. 9. In this case, only two steps are required for percolation given the same underlying random inputs that began the process.

Figure 11:
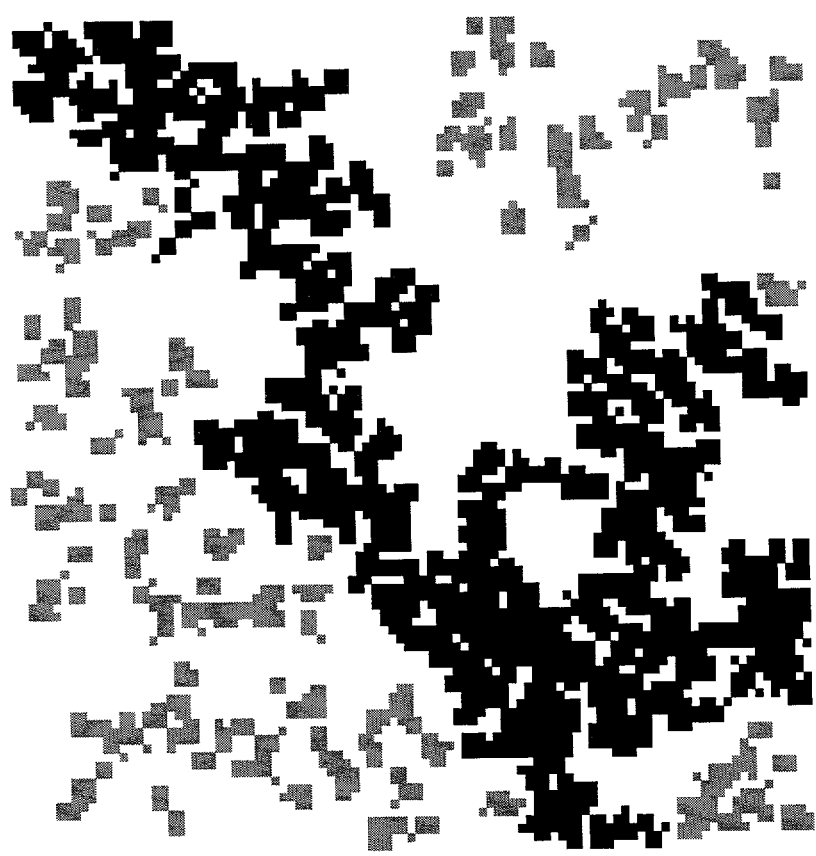
FIG. 11 illustrates a result of a single extinction step and feedback-driven rectification of a set in FIG. 10.
Figure 12:
FIG. 12 illustrates a first step in a third bottom-up cycle for remnants of sets from FIGS. 6-11.

FIG. 11 illustrates the result of a single extinction step and feedback-driven rectification of the set in FIG. 10. Here, the underlying values were changed to $\tanh(3x)$ for the percolating cluster, $\tanh(x/2)$ for the smaller clusters, and $\tanh(x/3)$ for all remaining pixels. FIG. 12 illustrates the first step in a third bottom-up cycle for the remnants of the sets from FIG. 11. In the final figure, the network almost percolates immediately. Obviously, the cluster would percolate and no residues would be present for an extinction step after normalization with 2×2 squares.

Network dynamics depend on the creation of attractors within channels and the dynamic interaction of the attractors among channels. Attractors within channels arise by phase changes there. Conditions for their creation arise by re-entrant connections, which also increase the dimension of the network's state space. Dynamic interactions among channels occur by means of divergent and convergent connections, with bi-directional links also adding to the dimension of a network state space. Channels can evolve by means of self-organization within arbitrarily large layers, or by re-entrant lateral connections across standardized channels.

Figure 13:
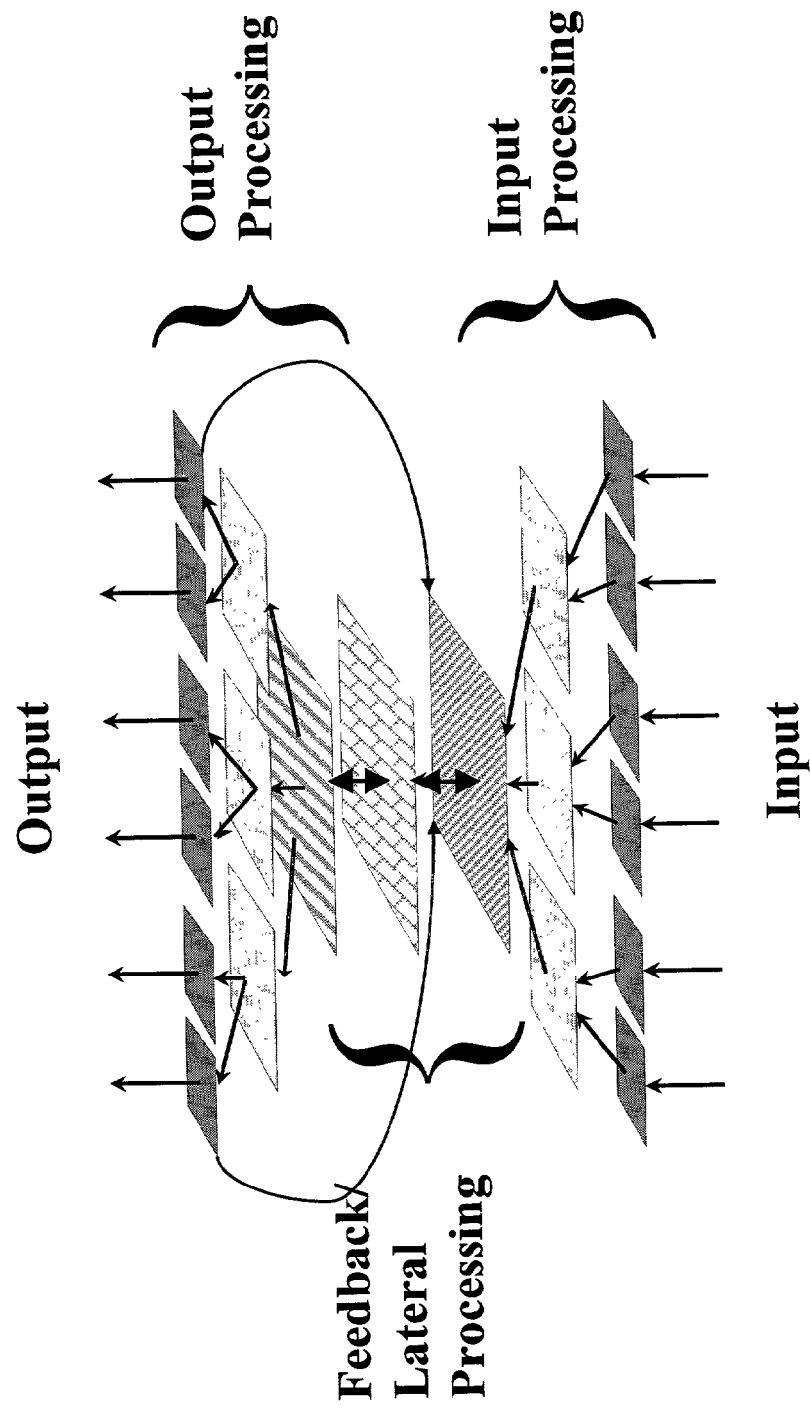
FIG. 13 illustrates a diagrammatic layer view of the invention according to a preferred embodiment, including converging input channels, multiple processing layers, and diverging output channels for feedback or communication with other channels in the architecture.

Most of these features are depicted in FIG. 13, which illustrates a diagrammatic layer view of the invention according to a preferred embodiment. It shows converging input channels, multiple bi-directional processing layers, and diverging output channels for feedback or communication with other channels in the architecture, as well as re-entrant connections to the processing layers to permit the creation of attractors. Divergent and convergent connections among channels are described below.

The layers in FIG. 13 consist of processing nodes. In subsequent diagrams, both the layer view here or a nodal view will appear, as appropriate. Unless the diagram ascribes a particular function to a layer or node, or unless it specifies the number of elements, the diagram is meant to be suggestive. That is, an architecture, if required, could have more or fewer elements of a given type.

Figure 14:
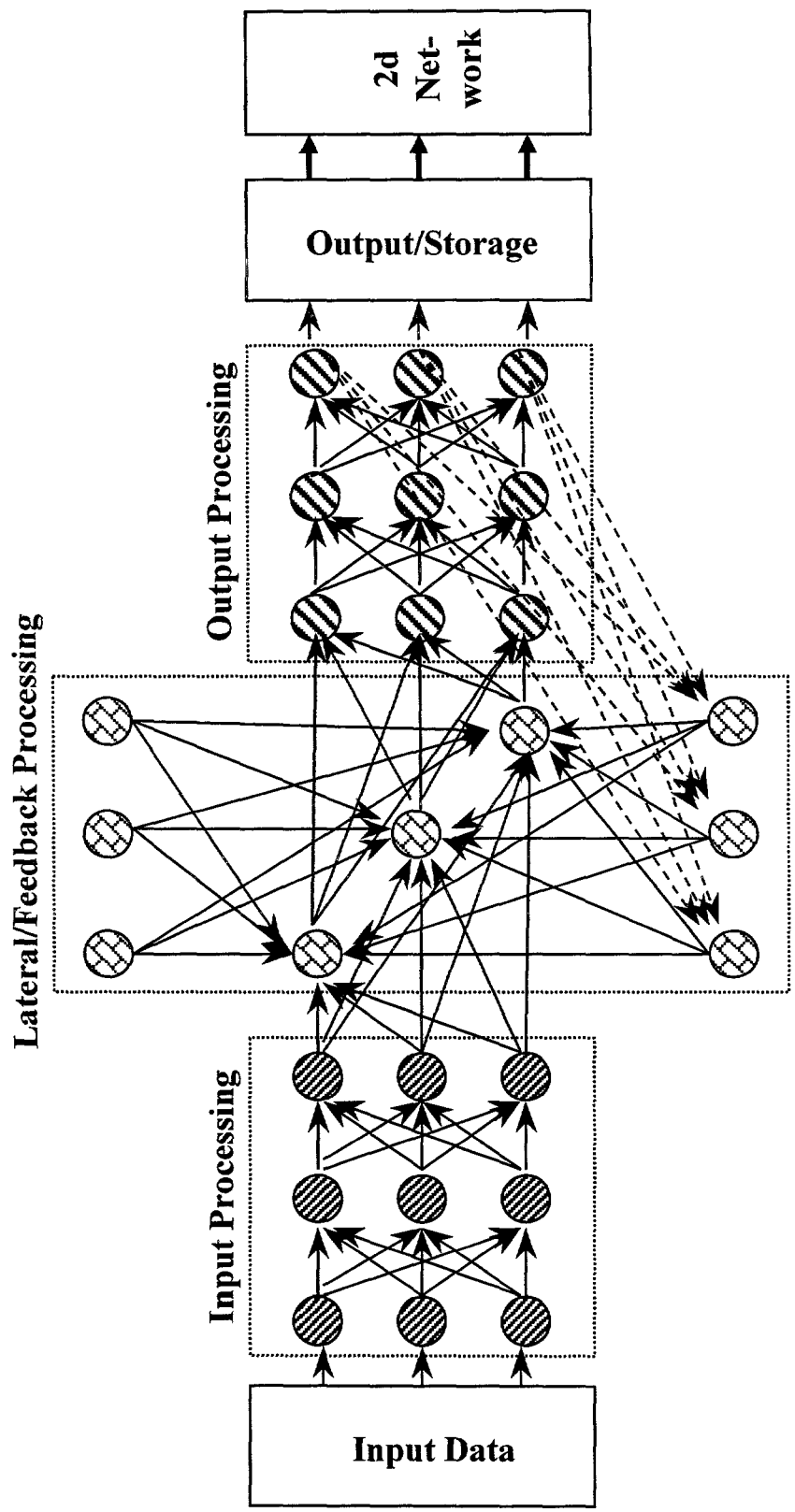
FIG. 14 illustrates a schematic nodal view of elements within a self-organizing channel, including simultaneous output and feedback to the central processing portion of the channel.

FIG. 14 illustrates a schematic nodal view of the elements within a self-organizing channel, including simultaneous output and re-entrant feedback to the central processing portion of the channel. Input processing consists of convergent, feedforward connections to the processing portion of the architecture. Outputs go as necessary to other channels or memory storage, and may also be used as the inputs for programming a second neural network.

FIG. 15 shows two potential variants for standardized processing channels. FIG. 15a illustrates a schematic layer view of a 3-layer processing channel with feedforward output and feedback. Input and output layers are depicted in gray, and may be implemented by more than the one layer shown. This diagram shows full feedback connectivity among the processing layers, and re-entrant feedback to the processing layers from the output layer.

FIG. 15b illustrates a schematic layer view of a 3-layer processing channel with bi-directional output channels and feedback. This kind of standardized component would accommodate related outputs that do not interact directly. For example, in language processing, to distinguish between the senses of the word "bat," which can be an animate noun, an inanimate noun or a verb, would not lend itself to a single look-up step. This is particularly the case when the verb can further be subdivided into actions which may or may not require wooden or metallic tubular objects to execute them, and the animate noun can be subdivided into a wide variety of species. Moreover, the word can appear as an adjective in such phrases as "bat cave." In such cases the final processing layer acts as a hidden intermediary between the output channels. The representations of the word to not interact directly. FIG. 15b also depicts re-entrant feedback to the processing layers and full feedback connectivity within the processing component of the channel.

Figure 16:
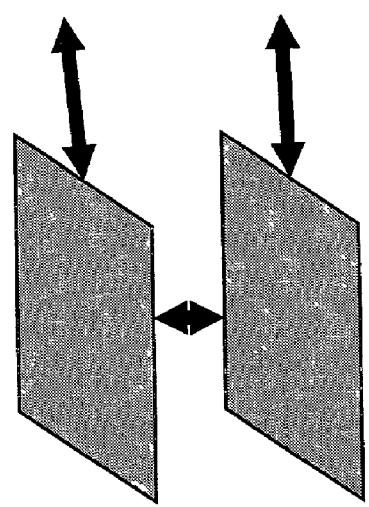
FIG. 16 illustrates a schematic layer view for an attention module.

FIG. 16 illustrates a schematic layer view for an attention module. Such a module would create bi-directional connections to processing elements of the channels in a network architecture, and would permit the top-down processing capable of amplifying the rectification of patterns shown in FIGS. 9 and 11.

Figure 17:
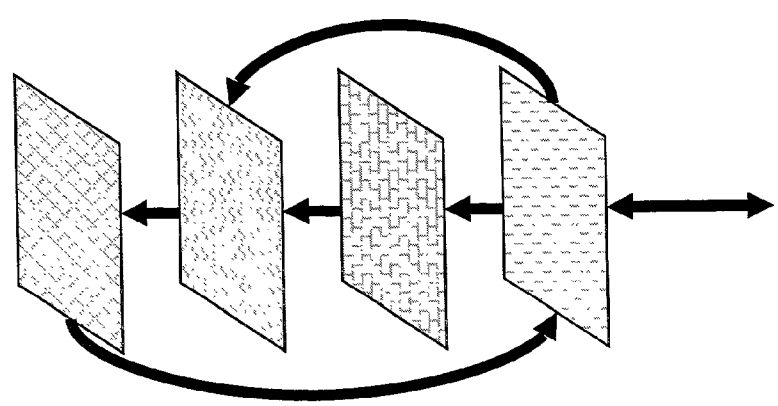
FIG. 17 illustrates a schematic layer view for a long-term dynamic memory module.

Neural network architecture can employ standard digital memory as input. Dynamic memory that evokes previous cross-channel states in the architecture is also possible. FIG. 17 illustrates a schematic layer view for a long-term dynamic memory module with bi-directional connectivity to an attention module and any processing channels in a neural network architecture. The storage layers are principally feed-forward to encourage a sparse coding action that is relatively stable over time.

Figure 18:
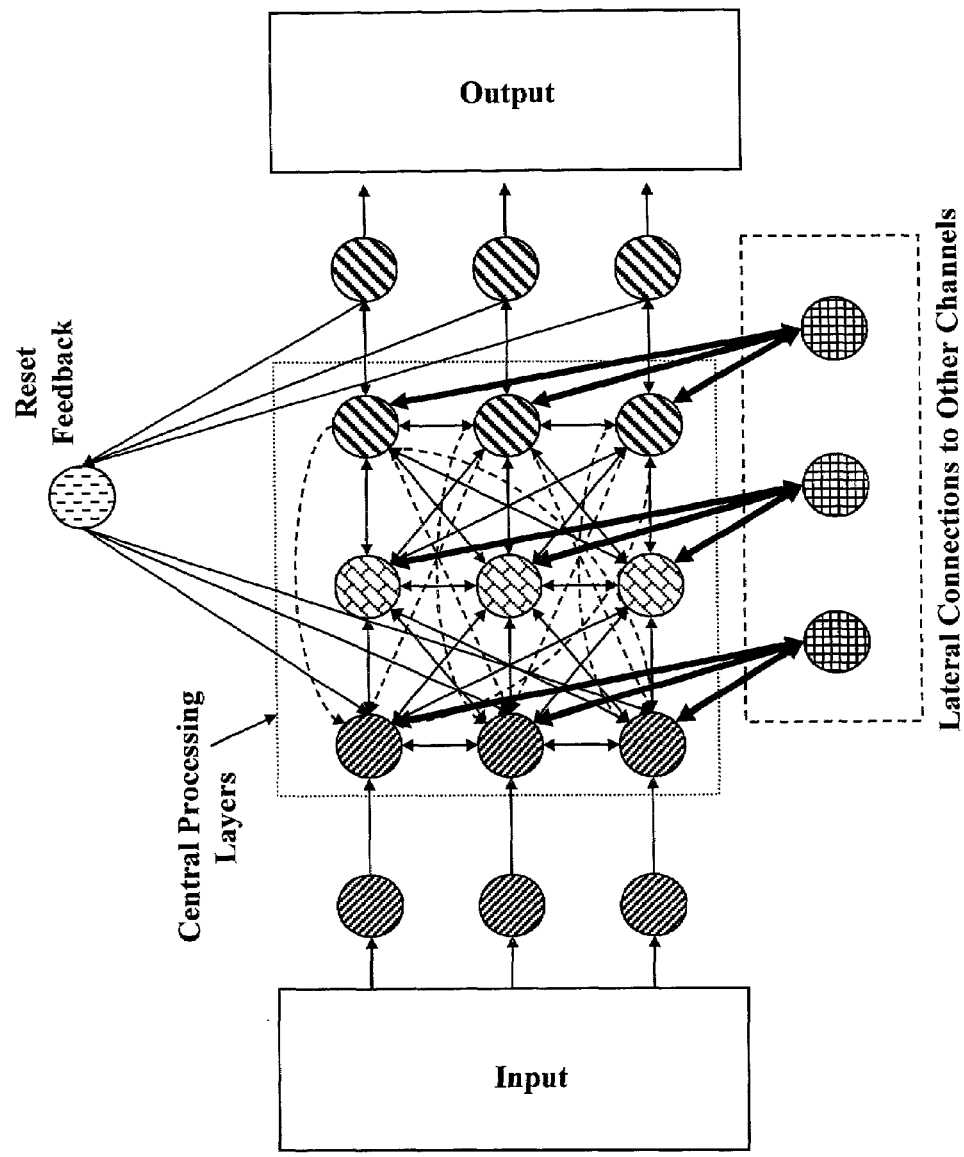
FIG. 18 illustrates a schematic nodal view of a 3-layer processing channel with lateral connections to other channels and feedback from output channels.

FIG. 18 provides an alternate schematic nodal view of a 3-layer processing channel with lateral connections to other channels and feedback from output channels. This describes input to each layer from parallel channels which may be desirable. Re-entrant feedback is also depicted. The "reset" feature is meant to depict the option of input from an attention module. Full feedback connectivity within the central processing layers is also shown.

The obvious parameter to provide a minimalization value for random percolation within the channels of a neural network architecture is the critical probability, or the critical intensity when the channel begins with a Poisson process. Above this value, the channel percolates, below it, it does not almost surely. Accordingly, a neural network architecture can be optimized for learning tasks by adjusting the dimensionality of the network and the connectivity weights so that it begins learning below the critical parameter. For rapid percolation along a channel, the optimal initial values would be below the critical parameter, but where the distance to that parameter is not large. Conversely, for interactions among the elements in a processing layer, where percolation would presumably not be optimal, connection weights should be well below the critical parameter, thus ensuring sparse coding within the layer. The role of lateral inhibition would be particularly important in this regard, as it would also help to confine percolation along the channel and prevent percolation across it.

The critical intensity or critical probability of a network architecture depends on its geometry, the connectivity of its elements between layers and across layers, and the time a given input affects the network. As noted before, re-entrant and feedback connections increase the dimensionality of the network in state space. Inhibition and decay of input signals prevent the dimensionality from increasing to infinity. Various forms for a decay function were discussed in Cooper, U.S. Pat. No. 6,009,418 in connection with learning rules derived from a Polya process, which is a non-stationary random process that can serve as an alternative to nearest-neighbor normalization discussed above. For example, to model "forgetting," which avoids saturation of the synaptic weights, the Polya rules can be modified by introducing a decay factor. Since the decay factor is not related to activity, but simply to time, any node that is inactive will eventually approach a connectivity of zero, for any non-zero decay rate. For connection weight $w_{ji}$ from node i to node j, initial weight $$\left|\frac{r}{s}\right| \leq 1,$$

number of excitations $\alpha$ and number of inhibitions $\beta$, decay at a node can then be modeled by:

$$w_{ji}(t) = \frac{r+\alpha-\beta}{s+\eta+\delta(t)}$$

for $\alpha+\beta=\eta$ all positive; $\delta(t) \geqq 0$ monotone increasing

Other decay rates are possible. For example, the common form $$w_{ji}(t) = \frac{r+\alpha-\beta}{s+\eta} - \delta(t), \delta(t) \geq 0$$

e.g. $\delta(t) = e^{-kt}\left(\frac{r+\alpha-\beta}{s+\eta}\right)$

A number of methods are available to estimate the critical probability or critical intensity for a network. Consider continuum percolation on a unit hypercube with dimension d. That is, the number of elements in a layer and the number of layers is arbitrarily large, and the network has sufficient re-entrant connections to provide a state space of dimension d. FIGS. 2-12 represent such a process for two dimensions assuming the individual pixels are reduced to zero area. For a Poisson process $(X_k, \rho_k, \lambda_k)$, where $X_k$ characterizes the process, $\rho_k$ is the diameter, and $\lambda_k$ is the intensity at step k, let $\rho_k = \alpha\rho$ with $a = m^{1-k}$, $\lambda_k = b\lambda$ with $b = m^{-d(1-k)} = m^{d(k-1)}$ for side $m^{-1}$ and step k. Let $$V_\infty = \bigcap_{k=1}^{\infty} V_k$$

be the vacant sections of the unit hypercube. $P(x=0)$ is independent at each step with $$P(0) = \exp\left(\left(\frac{-\lambda}{m^d}\right)\right)$$

$V_\infty = \emptyset$ almost surely when $m^d \exp\left(\frac{-\lambda}{m^d}\right) < 1$ so $$\lambda > m^{d\log}(m^d) = dm^{d\log}m$$

$$dimV_\infty = \log\left[m^d \exp\left(\frac{-\lambda}{m^d}\right)\right]\log m = d - \frac{\lambda}{m^d \log m}$$

Conversely, $$P(x \geq 0) \geq \exp\left(-m^{d(3-1)}\lambda\left[1 - \frac{1}{m^d}\right]\right)\exp\left(-m^{d(4-1)}\lambda\left[1 - \frac{1}{m^d}\right]\right) \geq$$

$$\exp(-\lambda m^d[m^{2d} - 1])$$

for each corner.

$V_\infty \neq \emptyset$ almost surely when $m^d \exp(-\lambda m^d[m^{2d} - 1]) > 1$ so $\lambda < \frac{\log(m^d)}{m^d(m^{2d} - 1)}$ and $$dimV_\infty = d - \frac{\lambda m^d}{\log m}(m^{2d} - 1)$$

Let $\theta_f(\lambda)$ be the probability that $V_\infty = \cap[0, 1]^d$ contains a connected component which intersects the opposite side of $[0, 1]^d$. Define $\lambda_f$ as $\lambda_f = \inf\{\lambda: \theta_f(\lambda) = 0\}$ Then $$\lambda_f > 0 \text{ and } \lim_{n\to\infty} \lambda_f(n) = \lambda_c^*(1) = \lambda_c(1)$$

so the critical parameter for percolation is the same as the critical fractal parameter, and marks the threshold where percolation occurs almost surely.

Similar results obtain for generalized Cantor sets applied to fractal percolation. A statistically self-similar random Cantor set is constructed as follows. $F = \cap_{k=1}^\infty E_k$ for $[0, 1] = E_0 \supset E_1 \supset \ldots$ With $E_k$ a union of $2^k$ disjoint basic intervals. For left/right intervals $I_L/I_R$ of $E_{k+1}$, $|I_L|/|I|$ and $|I_R|/|I|$ have the same probability distribution. This random Cantor set has $dim_H F = s$ such that $E(C_1^S + C_2^S \ldots) = 1$ for constants $C_{i_1,\ldots,i_k} = |I_{i_1},\ldots,I_{i_k}|/|I_{i_1},\ldots,I_{i_{k-1}}|$ for $a \leq C_{i_1,\ldots,i_k} \leq b$ and for all $i_1, \ldots, i_k$ and both L and R.

The probability q, that F is empty, is the smaller non-negative root of the polynomial $$f(t) \equiv \sum_{j=0}^m P(N = j)t^j = t$$

With probability 1−q the set F has Hausdorff and box dimension given by the solution of $$E\left(\sum_{j=0}^n C_i^S\right) = 1.$$

For a middle 1/m construction, and N the random number of hypercubes in $R^d$ of E, $$P(N = j) = \binom{m^d}{j} p^j(1 - p)_{m^d - j} t^j = (pt + 1 - p)^{m^d} = q$$

and $$E\left(\sum_{j=0}^{m^d} C_1^S\right) = 1 \to E\left(\sum_{j=0}^{m^d} m^{-S}\right) = m^{-S}E(N) = m^{-S}(m^d)P$$

so $$dim_H F_p = \frac{\log m^d P}{\log m}$$

$$= d\left(\frac{\log P}{\log m} + 1\right)$$

When p is determined by a Poisson process with number of trials n and intensity λ

$$dim_H F_P = d\left(\frac{\log n - \log \lambda}{\log m} + 1\right)$$

It is also possible to estimate the critical parameters empirically. For example, Okabe et al., *Spatial Tessellations,* (2000), at pages 361-362, incorporated by a reference herein, produced the following threshold probabilities for bond and site percolation models on Poisson Voronoi diagrams and Poisson Delaunay tessellations in $R^m$:

|  |  | Site | Bond |
| --- | --- | --- | --- |
| m = 2 | Delaunay | 0.5 | 2 sin (π/18) |
|  | Voronoi | 0.5 | 0.332 |
| m = 3 | Voronoi | 0.1453 | 0.0822 |

Given a set of distinct, isolated points in a continuous space, Voronoi diagrams associate the nearest regions of the space with each point. Delaunay tessellations can be constructed from Voronoi diagrams in m-dimensional space by joining points whose regions share an (m−1)-dimensional face. These are important tools in analyzing a self-organizing neural network architecture. To see this, assume two layers in an architecture are connected by overlapping projections (tessellations), so that a node on layer i can influence the projections of one or more of its neighbors on layer j. As the network evolves, these projections will be strengthened or weakened, depending on the interaction of the network with its environment. Eventually, competition among the nodes on layer i will exclude the influence from neighboring nodes on some portion of layer j for each node, thereby creating regions that can be captured in Voronoi diagrams or the associated Delaunay tessellation. This is an example of implicit calculation through the interaction of network elements, and how channels can organize themselves as a network evolves.

Thus, it is possible to harness locally interacting nodes in a neural network so that their inherent characteristics permit percolation across the network. Inter-nodal interactions provide the means to evolve self-organizing channels, as well as the feedforward properties necessary for composition. Re-entrant and feedback connections provide the necessary recursive properties for computation. Finally, critical percolation parameters provide the necessary factors for implicit minimalization within the network. When further interaction with the environment rectifies these factors further, percolation permits even more rapid learning and adaptation. Thus, all three conditions are present for implicit general computation.

These elements are present when the components of the network provide the properties for fractal percolation, regardless of their physical composition. Thus, digital implementation on semiconductor chips is not required. For example, as discussed in Cooper, U.S. Pat. No. 6,009,418, the Polya rules mentioned above already accommodate implementation by means which demonstrate Bose-Einstein statistics. Lasers fall into this category. This discussion goes further to describe how any dynamical system with non-stationary behavior can be employed. This is particularly true for systems where such non-stationary behavior amounts to a thermodynamic phase change. Consequently, this invention can be implemented in quantum embodiments when channels can undergo Bose-Einstein condensation, for example.

Computation theory teaches that the converse case is also possible. The output of any computation system can be duplicated by Turing machines provided with the necessary "prefix" that describes that system. In this sense, the present disclosure provides a framework for digital emulation of non-stationary elements linked together in a neural network. Such emulations can take advantage of known dynamical characteristics to enhance computation performance, which has already been accomplished in trials of Cooper, U.S. Pat. No. 6,009,418, which provided 26 percent improvement in deep-nested tree problems over hybrid backpropagation designs that had been optimized for particular problem sets.

This disclosure also offers a useful feature in allowing the development of standard components that can be linked together to solve particular computational problems. Such linkages can be virtual, using digital means on existing computers, or physical, using potentially much faster arrays of dynamic elements. The discussion of critical parameters above revealed some of the principles that would make this possible: modification of the dimensionality of the network by varying re-entrant and feedback connections, use of inhibition and decay to input signals, and adjustment of probabilities so that elements in a channel are either close to or far from the critical thresholds, as required. Moreover, the "leaky" processing described in Cooper, U.S. Pat. No. 6,009,418 and the overlapping tessellations mentioned in the discussion of Voronoi and Delaunay portrayals of m-dimensional spaces provide the necessary mechanism for standard-size channels to alloy larger layer arrangements when necessary: outputs to neighboring standardized channels spillover competition in neighboring channels, and thus the adaptive capability for a channel attractor to extend its influence over nodes not originally part of the standard channel structure.

These ideas permit a broad number of applications, a fraction of which are outlined below.

Figure 19:
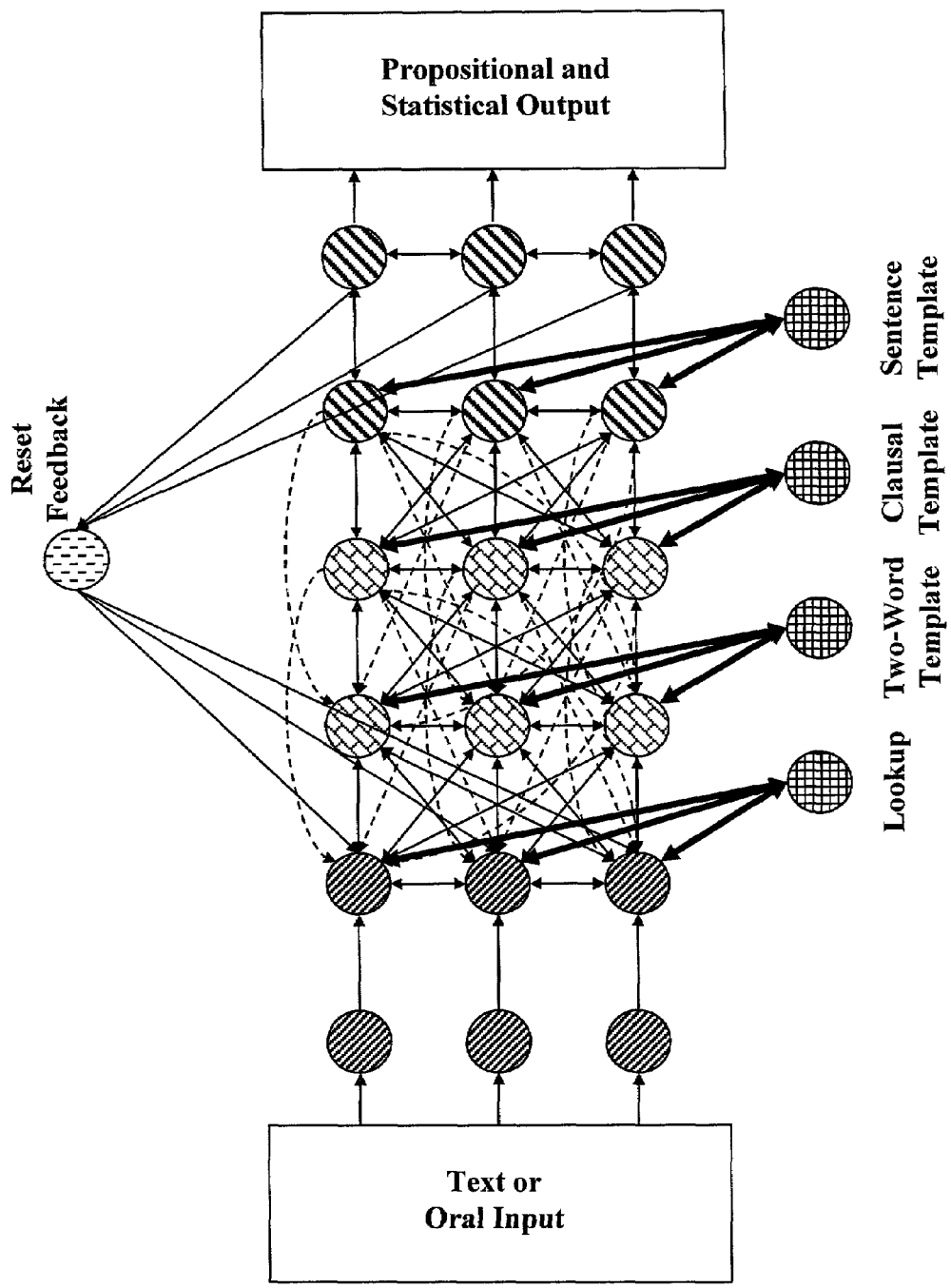
FIG. 19 illustrates a textual or oral language parser with lateral processing connectivity to different channels.

FIG. 19 illustrates a textual or oral language parser with lateral processing connectivity to different channels. The parser receives oral or written input separated into words. Oral inputs received as features or formants would require the more complex architecture at FIG. 25. The words proceed to the next layer, where the network accesses a glossary or dictionary, which labels the words by type. Lateral feedback at this level would suppress impossible combinations. At the next layer, the network matches each adjacent pair of words to possible templates, such as Determiner+Noun. Feedback to the previous layer would suppress further impossible combinations, and reinforce matches. Lateral feedback would also do this. At the third processing layer, the network would access clausal templates against the remaining pairs of words, again suppressing impossibilities and reinforcing matches. This layer would be capable of checking for word-order clues. Feedback from this layer to the first processing layer can check for verb agreement and other such characteristics, thereby reducing the number of remaining options, and reinforcing the rest. At the fourth processing layer, the network accesses sentence templates, which allows it to check for textual relations to other sentences, and to correlate portions of compound, complex, conditional, and other sentence types. Finally, the network resets itself for the next sentence and produces propositional outputs and any desired statistical data. At this level, the parser would be capable of reducing the input text to its logical propositional components (e.g., 'if a then b,' 'either a or b,' 'both a and b,' 'a but not b,' etc.), as well as to basic syntactic components $V(X, Y, Z)+A$, where 'V' is the verbal component of each clause, 'X' the focus, 'Y' the target (if any), 'Z' the reference (if any), and 'A' is the set of all adjuncts appended to each clause. These concepts and notations are discussed at greater length in Cooper, *Linguistic Attractors*, Chapter 5 (1999) incorporated by reference herein.

Figure 20:
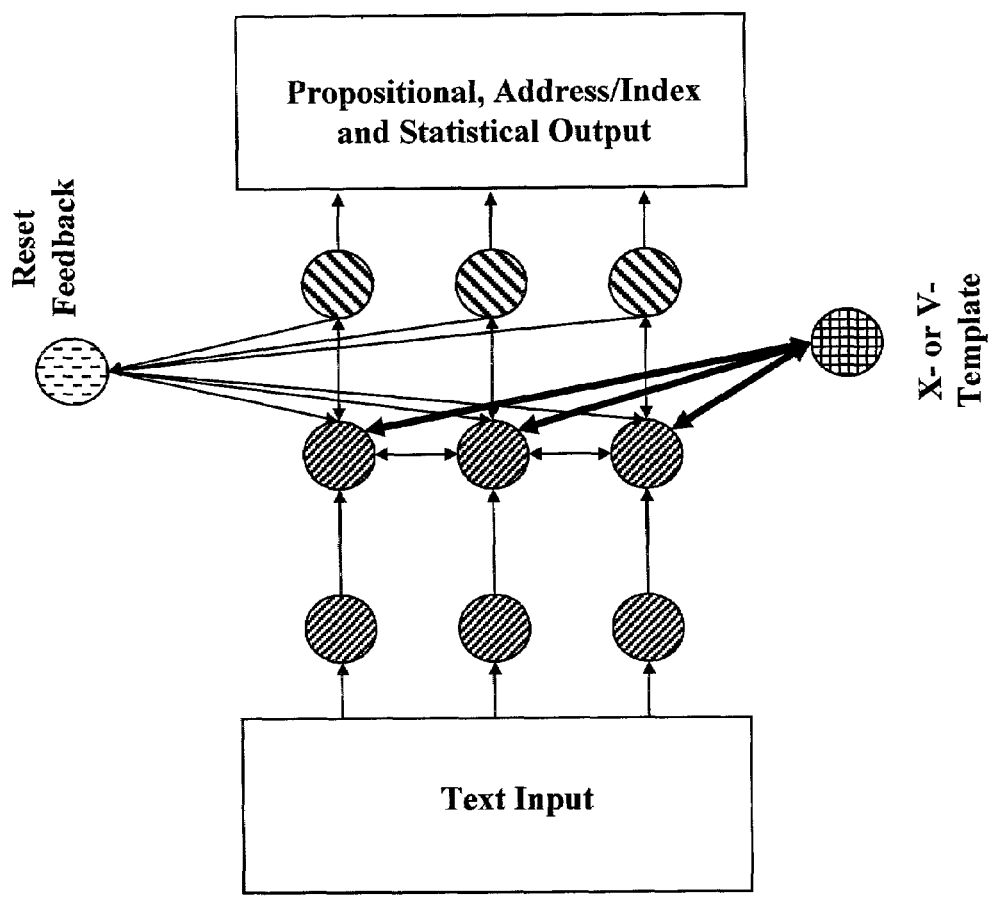
FIG. 20 illustrates a basic file searcher with lateral connectivity to a single processing layer.
Figure 21:
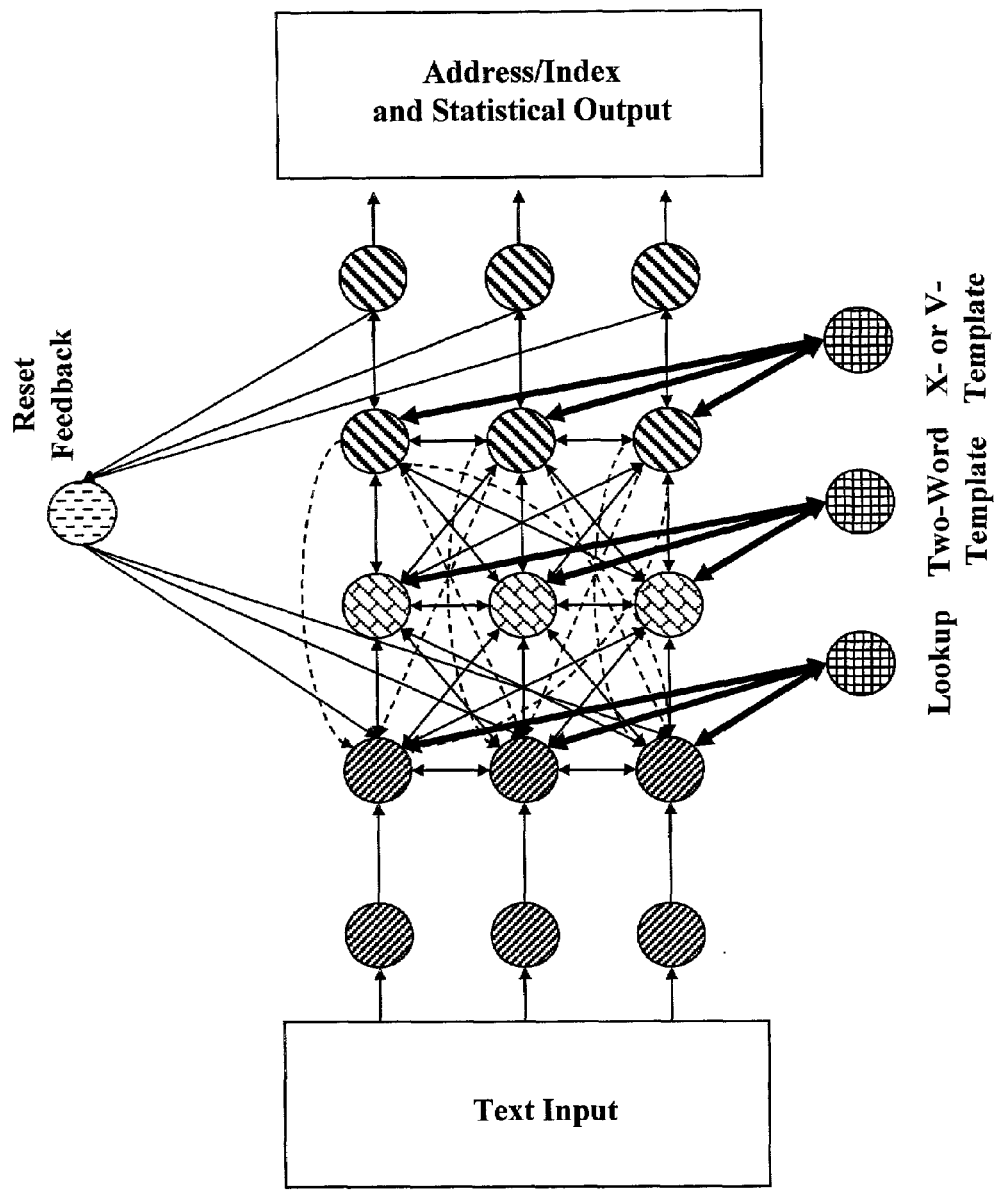
FIG. 21 illustrates an advanced file searcher with lateral connectivity to three central processing layers from selected parallel channels.
Figure 22:
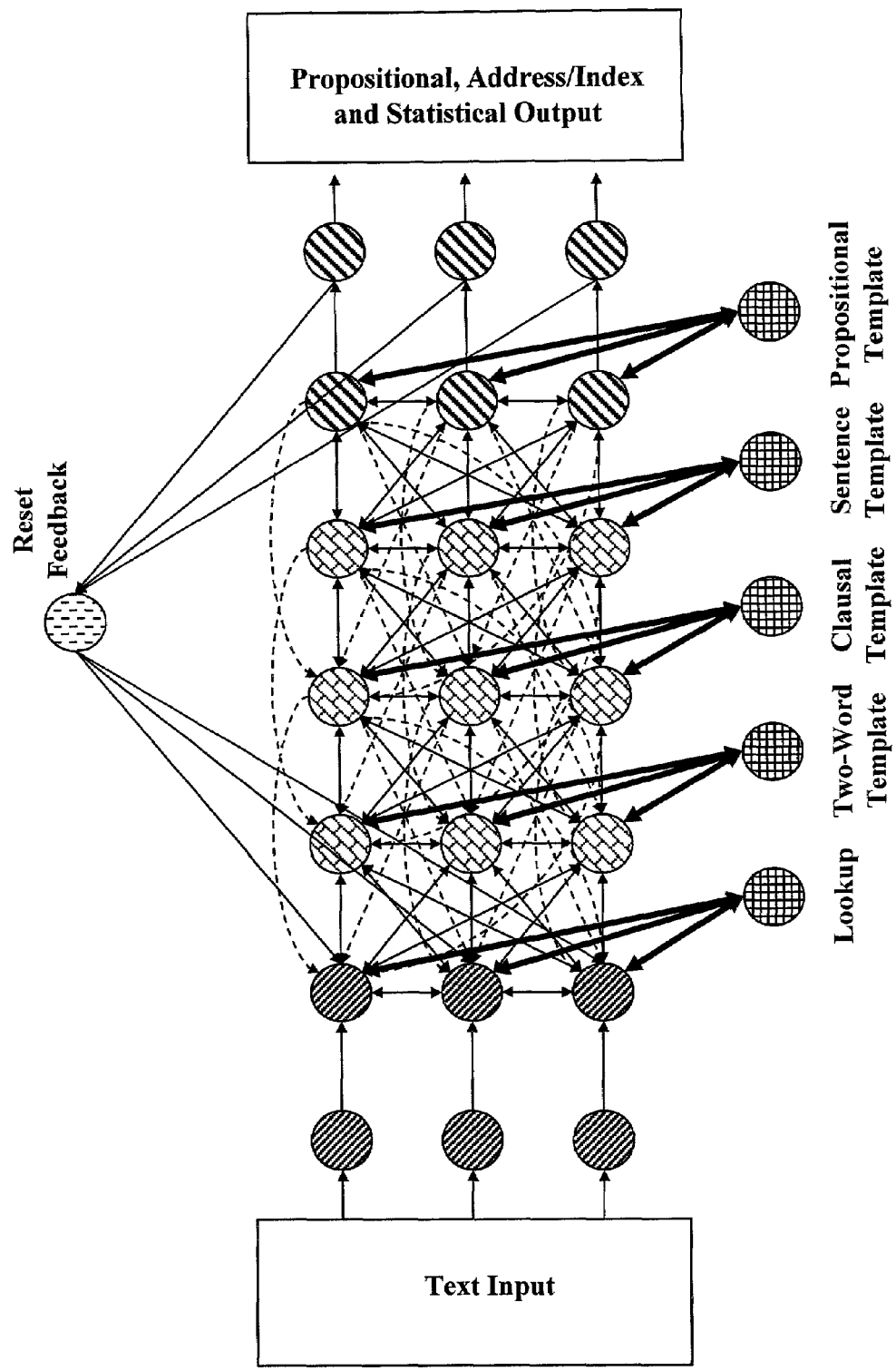
FIG. 22 illustrates an advanced file searcher capable of portraying propositional content of the files, with six central processing layers and selected lateral connectivity to parallel channels.

The file searcher designs in FIGS. 20-22 are related to the parser in two ways. First, they share the architectural features mentioned above, with more and more layers added as more and more advanced features are added. Second, they rely on parser outputs as templates for the search. In FIG. 20, the basic search design relies on X- or V- template inputs from the parser. The X- template would produce a noun index related to the focus (typically the subject) noun phrases in a basic text, thereby creating relatively sophisticated search parameters simply by parsing a base document of interest. Similarly, the V-template would employ the verbs as the basis for search. The more advanced search architecture at FIG. 21 allows more processing of the searched files before employing the parser inputs. The searcher would then match X- or V- templates from the base document against comparable arrays in the searched files, thereby creating an index of matching clausal parameters, rather than simple nouns or verbs. The most sophisticated of these searchers is at FIG. 22, which would match entire propositional outputs from the base document and all searched files. See Cooper, *Lingustic Attractors* (1999) for further discussion of the basic concepts.

Figure 23:
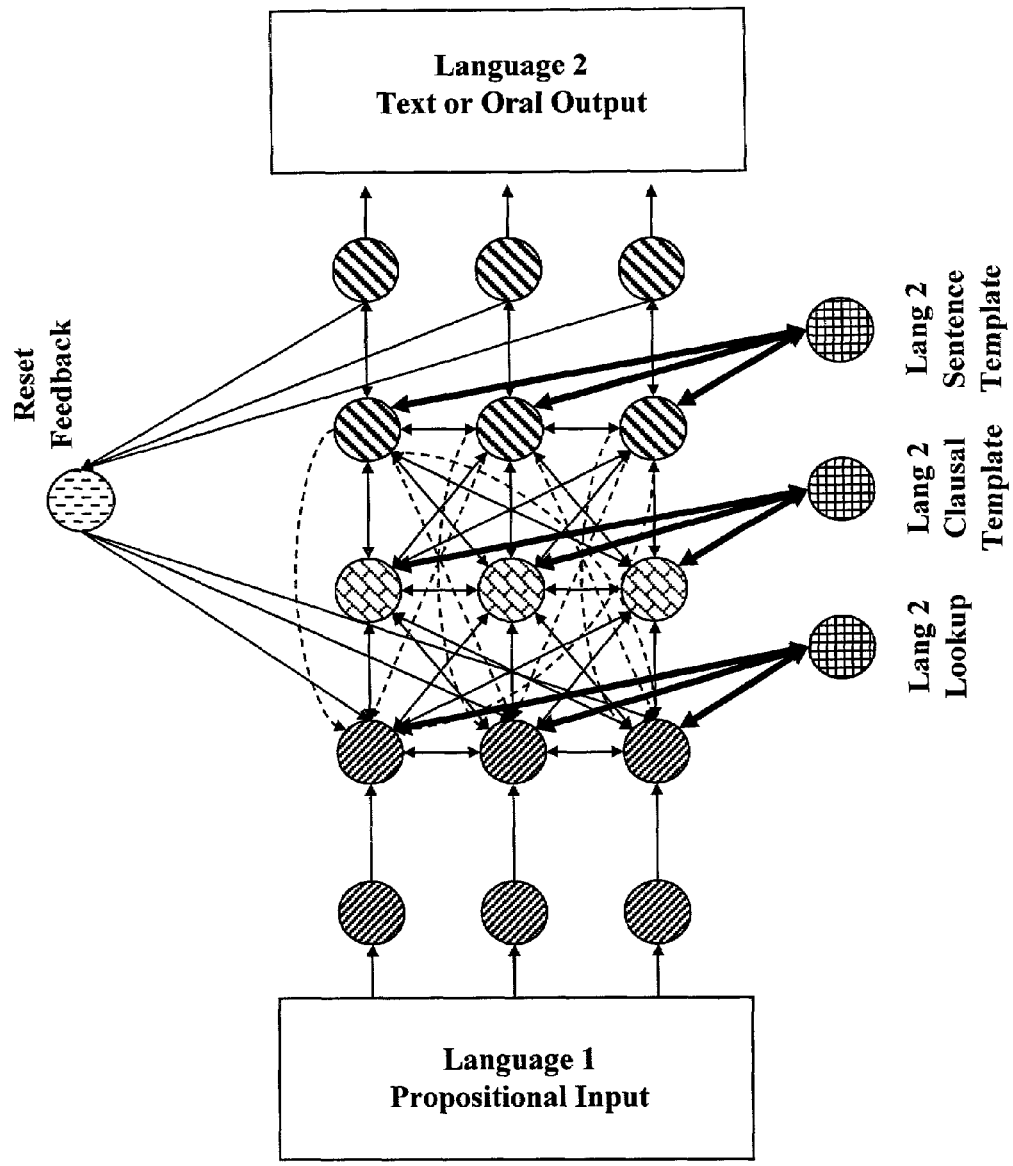
FIG. 23 illustrates a natural language translator with three central processing layers and selected lateral connectivity to parallel channels.

FIG. 23 applies this approach to language translation. It takes the propositional output from a parsed document (e.g., from FIG. 19) or a parsed oral expression (e.g., from FIG. 25) in one language. It then looks up the words for matches in a second language, adjusts the alternatives against clausal templates of the second language, and finally against full sentence templates. The output would be an expression in the second language with the same propositional content as the input expression.

Figure 24:
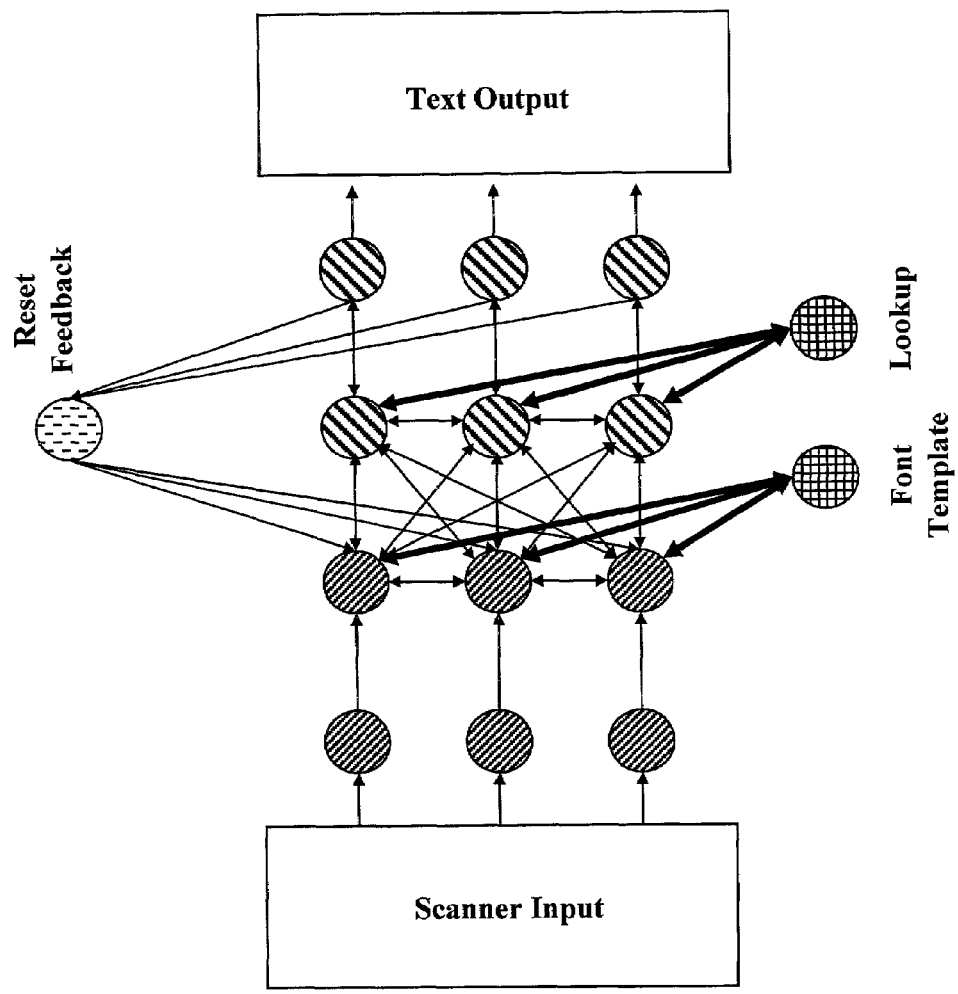
FIG. 24 illustrates a basic "smart" scanner with two central processing layers and selected lateral connectivity to parallel channels.

FIG. 24 represents a "smart" scanner, which takes inputs from a scanning device, matches the scanned characters against stored font templates, and adjusts the results based on a subsequent retrieval of dictionary information. As with the searcher design, smart scanners can employ any of the lookup/template levels from the parser architecture to adjust the final estimate of what has been scanned.

Figure 25:
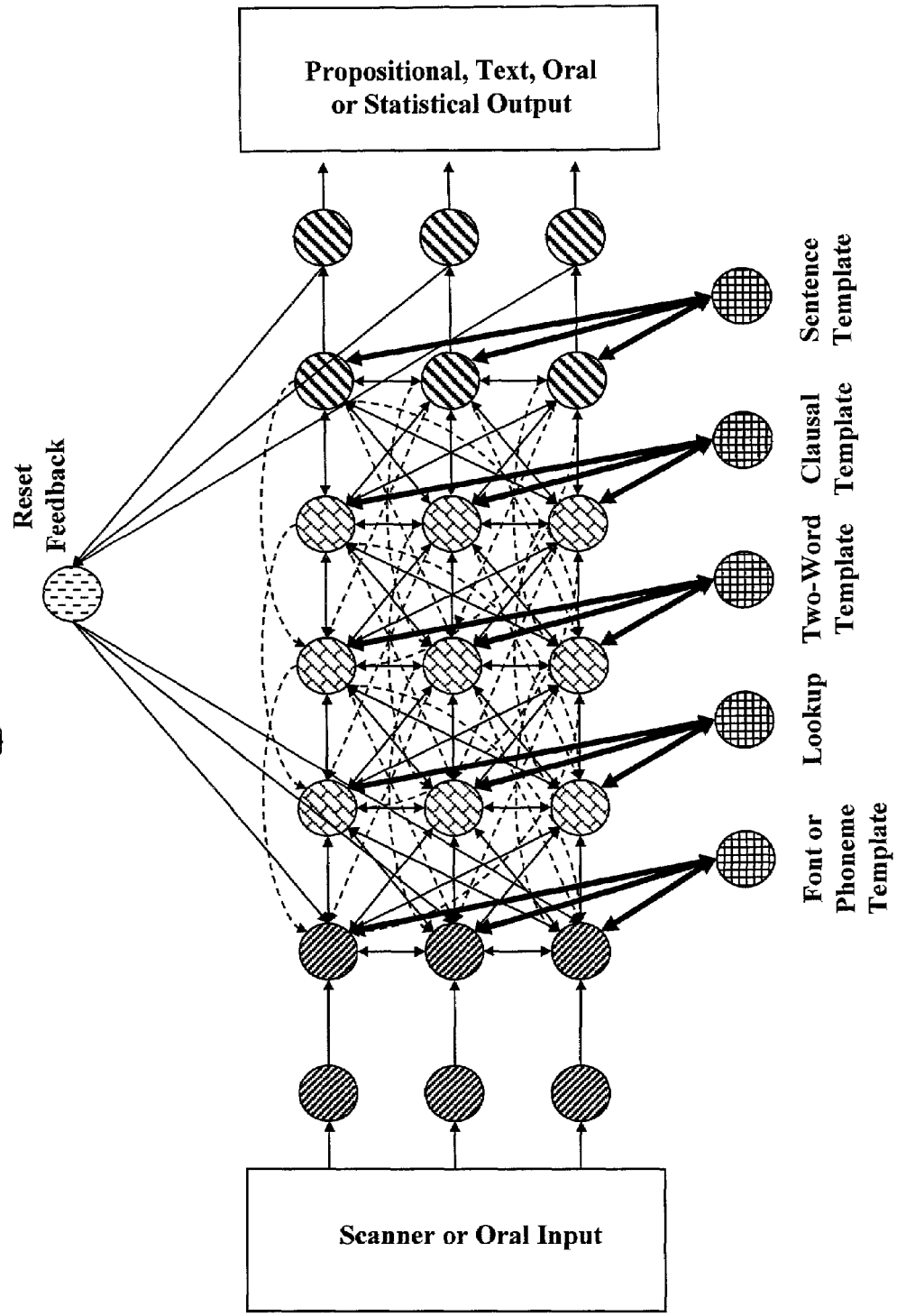
FIG. 25 illustrates an advanced "smart" scanner with six processing layers and selected lateral connectivity to parallel channels.

The most sophisticated scanner is represented at FIG. 25, which brings sentence templates to bear before producing an output. This architecture would also work for oral input, with phoneme data rather than character data.

Figure 26:
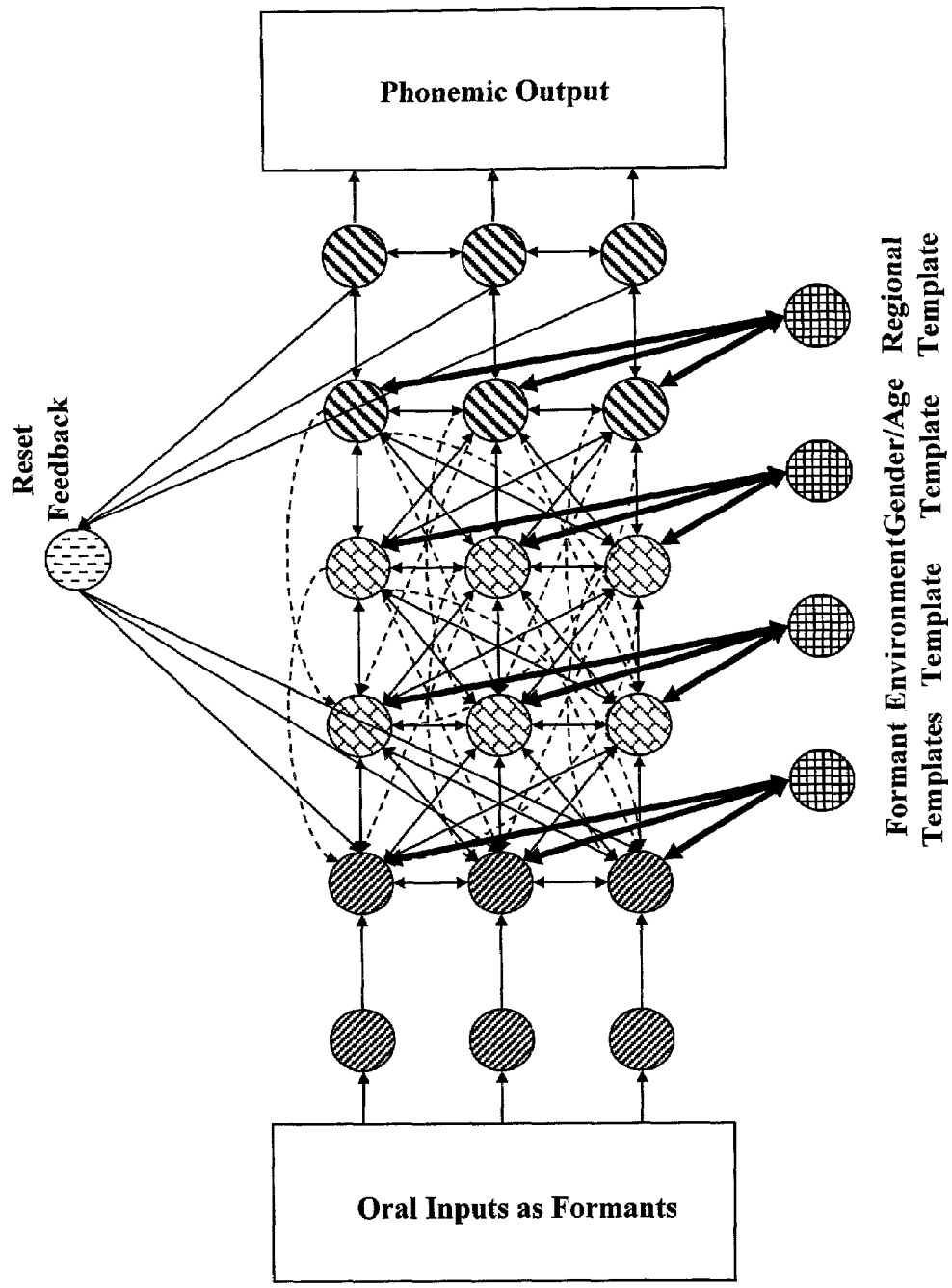
FIG. 26 illustrates a natural language dialect parser with four processing layers and selected lateral connectivity to parallel channels.

FIG. 26 shows a design to help calibrate verbal signals. It takes oral inputs as processed into features or formants, then adjusts those estimates for the phonemic environment, for the estimated age and gender of the speaker, and then for regional (dialect) effects. The final output is in standard phonemes, which can be employed by the advanced parser at FIG. 25.

Figure 27:
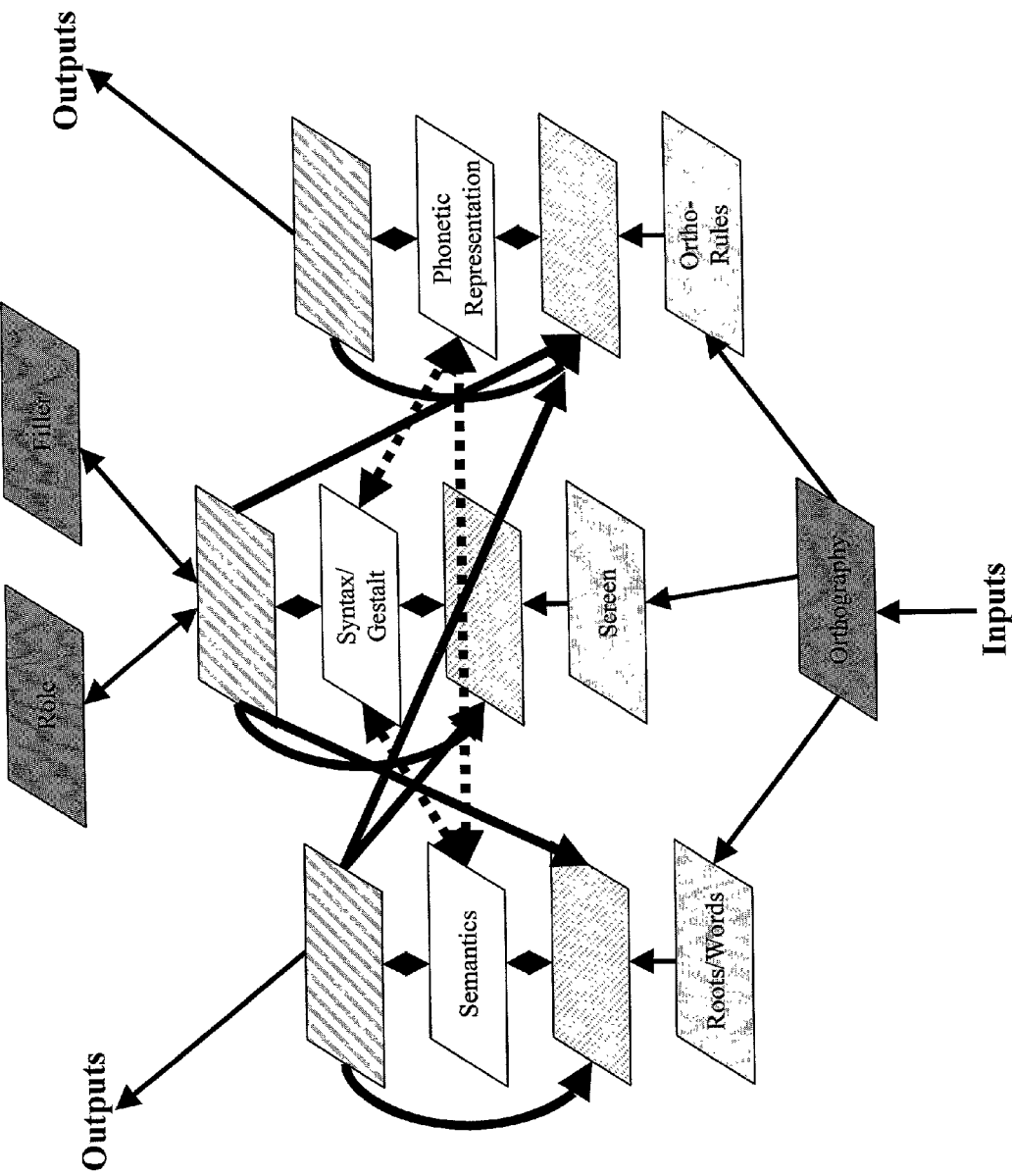
FIG. 27 illustrates an alternative channel structure for written language processing, with feedback from each channel to the first processing layer of parallel channels, and lateral connectivity among the second processing layers of the three channels.

As the foregoing discussion implies, these channel structures can be combined. FIG. 27 illustrates an alternative channel structure to FIGS. 19-22 for written language processing that employs both standardized channel components from FIG. 15. The channel designs in FIGS. 25 and 26 could be employed equally well. FIG. 27 also depicts feedback from each channel to the first processing layer of parallel channels, and lateral connectivity among the second processing layers of the three channels. Consequently, this figure also shows how some of the word and sentence templates in previous figures could be developed in a single network. The roots/words layer screens for word templates, similar to a dictionary lookup. This directly feeds a semantics layer, but indirectly influences channels for syntax and phonemics. Similarly, the layer for screening sentences feeds the layer for syntactic templates ("Syntax/Gestalt"), and the layer for orthographic rules feeds the layer for phonetic representations. Unlabeled layers provide additional processing, normally associated with "hidden" layers in the art. The bi-directional outputs to the role and filler layers provide the processing for ambiguous elements such as the word "bat" described earlier in the disclosure.

Figure 28:
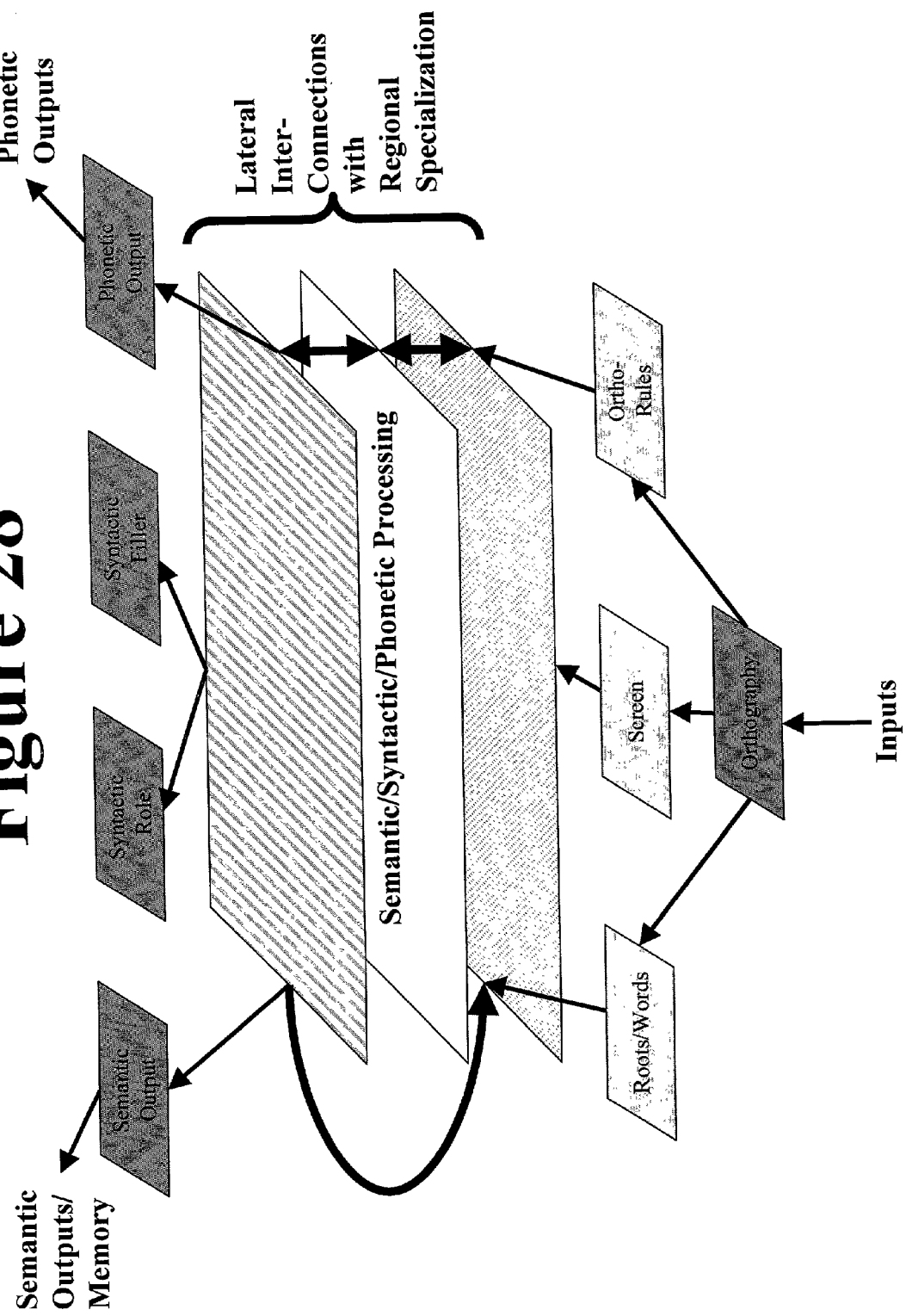
FIG. 28 illustrates an alternative processing structure for written language processing similar to FIG. 27, which relies on self-organizing interlayer tessellation among the central processing layers.

FIG. 28 illustrates an alternative processing structure for written language processing similar to FIG. 27, which relies on self-organizing interlayer tessellation among the central processing layers. This embodiment would permit freer self-organization than the design in FIG. 27, but at the expense of longer learning times.

Figure 29:
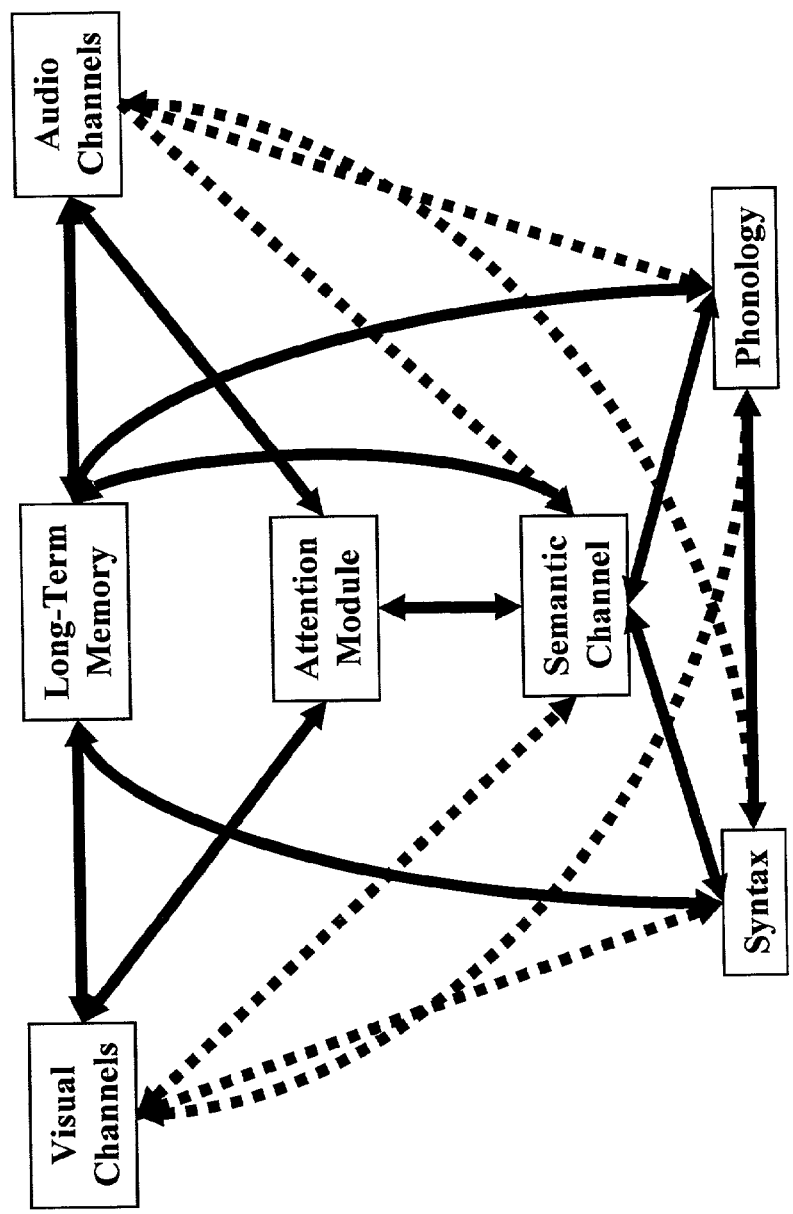
FIG. 29 illustrates an alternative channel structure for textual and oral natural language Processing.

FIG. 29 illustrates an alternative channel structure for oral or textual natural language processing, with an attention module and a dynamic long-term memory module. Bold lines are bi-directional. The dashed lines are feedforward. The attention module is connected to the bottom two processing layers of the connected channels. Long-term memory is linked to a single processing layer, normally the first or second. As with FIG. 27, feedback for the remaining modules is through the first processing layer in the connected parallel channels; lateral connectivity is provided among the second processing layers. Connections to the dynamic long-term memory module are through the first layer.

FIGS. 18, 19, 21-23, 25, and 26 illustrate alternatives where more than two layers of parallel channels possess lateral connections.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A computerized accelerated learning method for image-based decision system applications such as machine vision, non-contact gauging, inspection, robot guidance, medical imaging o accelerate learning maturity and enhance learning outcome comprises the following steps:
   (a) input learning samples images;
   (b) perform object of interest implantation on images using the learning samples images to generate simulated learning samples containing simulated objects of interest in the images;
   (c) perform computerized algorithm learning using the input learning samples images and the simulated learning samples images.

2. The method of claim 1 wherein the object of interest implantation on images includes a texture mapping method extracting the defects from different products and mapping into normal images of the new product.

3. The method of claim 1 wherein the object of interest implantation on images uses geometry and intensity models defining the shape and pixel intensity of objects of interest.

4. The method of claim 1 wherein the object of interest implantation on images uses manual image editing of known good images to create negative or positive learning samples.

5. The method of claim 1 wherein the object of interest implantation on images uses a combination of methods selected from the set consisting of:
   (a) texture mapping method extracting the defects from different products and mapping into normal images of the new product,
   (b) geometry and intensity modeling defining the shape and pixel intensity of objects of interest, and
   (c) manual image editing of known good images to create negative or positive learning samples.

6. The method of claim 1 wherein learning includes an computerized algorithm training process.

7. The method of claim 1 wherein the learning includes a computerized startup learning process.

8. The method of claim 3 wherein the geometry and intensity models use one or more image models selected from the set consisting of:
   (a) image circle model,
   (b) image donut model,
   (c) image rectangle model,
   (d) image spline curve model, and
   (e) image comet model.

9. An accelerated computerized algorithm training method for image-based decision system applications such as machine vision, non-contact gauging, inspection, robot guidance, medical imaging to accelerate learning maturity and enhance learning outcome comprises the following steps:
   (a) input learning samples images;
   (b) perform object of interest implantation on imams using the learning samples to generate simulated learning samples containing simulated objects of interest in the images;
   (c) perform computerized algorithm training using the learning samples images and the simulated learning samples images.

10. The method of claim 9 wherein the object of interest implantation on images includes a texture mapping method extracting the defects from different products and mapping into normal images of the new product.

11. The method of claim 9 wherein the object of interest implantation on images uses geometry and intensity models defining the shape and pixel intensity of objects of interest.

12. The method of claim 9 wherein the object of interest implantation on images uses manual image editing of known good images to create negative or positive learning samples.

13. The method of claim 9 wherein the object of interest implantation on images uses a combination of methods selected from the set consisting of:
   (a) texture mapping method extracting the defects from different products and mapping into normal images of the new product,
   (b) geometry and intensity modeling defining the shape and pixel intensity of objects of interest, and
   (c) manual image editing of known good images to create negative or positive learning samples.

14. The method of claim 9 wherein the computerized algorithm training further comprises:
   (a.) input additional learning sample images following initial computerized algorithm training;
   (b) perform test using the additional learning samples images and adjustment to achieve the performance goals, and
   (c) output a general computerized algorithm including algorithm architecture and default parameters.

15. The method of claim 11 wherein the geometry and intensity models use at least one image model selected from the set consisting of:
   (a) image circle model,
   (b) image donut model,
   (c) image rectangle model,
   (d) image spline curve model, and
   (e) image comet model.

16. The method of claim 14 further comprising input performance goals and expected tolerances for the computerized applications.

17. The method of claim 9 wherein the object of interest implantation on images comprises:
   (a) input expected computer application tolerances; (b) output initial simulated learning samples images using initial learning sample images and expected computer application tolerances;
   (c) input additional learning samples-images;
   (d) output additional simulated learning samples images using the additional learning sample images and expected computer application tolerances.

18. A computerized accelerated start-up learning method for image-based decision system applications such as machine vision, non-contact gauging, inspection, robot guidance, medical imaging to accelerate learning maturity and enhance learning outcome comprising:
   (a) input start-up learning sample images;
   (b) perform object of interest implantation on images using the start-up learning sample images to generate simulated learning samples containing simulated objects of interest in the images;
   (c) perform computerized start-up learning on a general computerized algorithm using the input start-up learning samples images and the simulated learning samples-images.

19. The method of claim 18 wherein the object of interest implantation on images comprises a texture mapping method extracting the defects from different products and mapping into normal images of the new product.

20. The method of claim 18 wherein the object of interest implantation on images uses at least one geometry and intensity model defining the shape and pixel intensity of objects of interest.

21. The method of claim 18 wherein the simulated learning sample images simulate defective samples images.

22. The method of claim 18 wherein the object of interest implantation on images uses a combination of methods selected from the set consisting of:
   (a) texture mapping method extracting the defects from different products and mapping into normal images of the new product,
   (b) geometry and intensity modeling defining the shape and pixel intensity of objects of interest, and
   (c) manual image editing of known good images to create negative or positive learning samples.

23. The method of claim 18 wherein the computerized startup learning further comprises:
   (a) input at least one start-up learning samples images;
   (b) input a computerized general algorithm; (c) output an application specific computerized algorithm using the at least one start-up learning samples images;
   (d) perform automatic computerized adjustment using simulated learning samples images to generate an application specific computerized algorithm.

24. The method of claim 20 wherein the geometry and intensity models use at least one image model selected from the set consisting of
   (a) image circle model,
   (b) image donut model,
   (c) image rectangle model,
   (d) image spline curve model, and
   (e) image comet model.

25. The method of claim 17, wherein at least one of the plurality of modules includes a CNOT gate.

26. The method of claim 1, further including the steps of:
   copying values for critical probabilities for a lattice formed by the computational nodes from the neural network architecture; and
   writing the values to another neural network.

27. An apparatus for implicit digital computation comprising:
   a neural network architecture means having a plurality of layer means, each layer means comprising a plurality of computational nodes, each of the plurality of computational nodes being implemented as a software process on a general purpose computer or by a digital or analog hardware device, the plurality of layer means comprising:
   a processing layer means including:
      at least one input processing layer means which is capable of rendering a stable transformable digital representation of input signals,
      at least one central processing layer means, and
      at least one output processing layer means;
   feedforward input channel means;
   full lateral and feedback connection means within the processing layer means; output channel means;
   re-entrant feedback means from the output channel means to the processing layer means; means for updating each of the plurality of computational node means using local update processes; and
   means for using re-entrant feedback from the output channel means to perform minimalization for general computation such that said stable transformable digital representations of input signals are distributed to the plurality of computational nodes which combine the stable transformable digital representations of input signals according to the interconnectivity of the at least one input processing layer and the plurality of computational layers, and which perform minimization steps on on the plurality of combinations to match at least one specified success criteria whereby the said minimization step selects from an inventory of at least one output value based on the said plurality of combinations at the moment of the selection step to minimize the difference between the said plurality of stable transformable combinations and the said at least one success criteria, whereby the selection weight for said selection is decreased when the plurality of subsequent input stable transformable combinations diverges from the said at least one success criteria, and the selection weight for said selection is increased when the plurality of subsequent input stable transformable combinations converges with said at least one success criteria.

28. The apparatus of claim 27, wherein the output channel means uses feedforward connection means between the output channel means and the processing layer means.

29. The apparatus of claim 27, wherein the output channel means uses bi directional connection means between the output channel means and the processing layer means.

30. The apparatus of claim 27, wherein the re-entrant feedback means is uni-directional.

31. The apparatus of claim 27, wherein the re-entrant feedback means is bi- directional.

32. The apparatus of claim 27, wherein the local update processes are any one of: random processes between the plurality of adaptPte computational nodes, non-stationary random processes between the plurality of computational nodes, Polya processes between the plurality of adaptive computational node means, and Bose-Einstein processes between the plurality of ad.aptPte computational nodes means.

33. The apparatus of claim 27, wherein the local update processes are Bose-Einstein processes and the plurality of computational nodes are lasers.

34. The apparatus of claim 27, wherein the local update processes are a phase change in the plurality of computational nodes.

35. The apparatus of claim 27, wherein the local update processes are a Bose-Einstein condensation in the plurality of computational nodes.

36. The apparatus of claim 27, wherein the local update processes are quantum measurements performed on the plurality of computational nodes.

37. The apparatus of claim 27, wherein the local update processes perform nearest-neighbor normalization among the plurality of computational nodes.

38. The apparatus of claim 27, wherein the local update processes create a Delaunay tessellation from one layer means to a next layer means.

39. The apparatus of claim 27, wherein the local update processes include inhibition between at least one of adaptive computational node means and at least one other of the plurality of computational nodes.

40. The apparatus of claim 27, wherein the local update processes cause fractal percolation among the plurality of computational nodes.

41. The apparatus of claim 27, wherein the minimalization recalibrates the adaptive computation node means in the processing layer means.

42. The apparatus of claim 27, wherein the minimalization step is triggered by fractal percolation across the plurality of computational nodes.

43. The apparatus of claim 27, wherein the minimalization step is a quantum measurement performed on the plurality of computational nodes.

44. The apparatus of claim 27, wherein the plurality of layer means is one module means in an architecture with a plurality of module means.

45. The apparatus of claim 44, wherein one of the plurality of module means is an attention module means that includes:
    at least two layer means connected by bi-directional connection means; and
    lateral connectivity means to at least two processing layer means belonging to other module means.

46. The apparatus of claim 44, wherein one of the plurality of module means is a standard digital memory means.

47. The apparatus of claim 44, wherein one of the plurality of module means is a dynamic memory means that includes:
    a plurality of layer means including a plurality of computational nodes;
    feedforward input means from the output channel means of other module means;
    feedforward connectivity means from a first to a last layer means; and
    feedforward re-entrant connection means to the first layer means using bi-directional
    connectivity means between the module means and the processing layer means from the other module means.

48. The apparatus of claim 44, wherein the module means have standardized dimensions number of layer means and a standardized number of adaptive computational node means, and wherein each module means includes:
    connectivity means from the input processing layer means of each module means to a neighboring module means; and
    lateral connectivity means between a corresponding processing layer means to permit leaky processing.

49. The apparatus of claim 44, wherein the plurality of module means provide converging and diverging connection means from the output layer means of each module means to processing layer means of other module means.

50. The apparatus of claim 44, wherein one module means includes at least one of a logic gate, aNAND gate, and a CNOT gate.

51. A method for computation using a of a neural network architecture in a computing device comprising the steps of: organizing a plurality of computational nodes into a neural computing device, each of the plurality of computational nodes being implemented as a software process on a general purpose computer or by a digital or analog hardware device, wherein the architecture of the neural computing device comprises: using at least one stable transformable digital representation as an input to receive data to be processed from an environment; using a locally connected subset of the plurality of computational nodes for fractal percolation using the at least one stable transformable digital representation;
    using a minimalization step for computation; and
    using at least one output to output processed data that can be used by a human or as an input to a machine.

52. The method of claim 51, further including the steps of:
    copying values for critical probabilities for a lattice formed by the computational nodes from the neural network architecture; and
    writing the values to another neural network.

53. The method of claim 51, wherein the plurality of locally connected computation nodes has a state space of dimension of at least two.

54. The method of claim 51, wherein the plurality of locally connected computation nodes has a Hilbert state space.

55. The method of claim 51, wherein connections among the plurality of locally connected computation nodes extend beyond nearest neighbors.

56. The method of claim 51, wherein connections among the plurality of locally connected computation nodes are feedforward connections, leading to "first-pass" percolation.

57. The method of claim 51, wherein at least one connection among the plurality of locally connected computation nodes is an inhibitory connection.

58. The method of claim 51, wherein the minimalization step is performed by re-entrant connections to the plurality of locally connected computation nodes.

59. The method of claim 51, wherein the fractal percolation across the plurality of locally connected computational nodes occurs by one of a random process, a Poisson process, a non stationary random process, a Polya process, and a Bose-Einstein statistical process.

60. The method of claim 51, wherein the fractal percolation across the plurality of locally connected computation nodes occurs by nearest-neighbor renormalization.

61. The method of claim 51, wherein the minimalization step is performed by re-scaled weights among the plurality of locally connected computation nodes.

62. The method of claim 51, wherein the minimalization step is performed by a quantum measurement.

63. The method of claim 51, wherein the plurality of locally connected computational nodes are one module in an architecture with a plurality of modules.

64. The method of claim 63 wherein one of the plurality of modules is an attention module using bi-directional connections with at least one other module.

65. The method of claim 63, wherein one of the plurality of modules is a standard digital memory.

66. The method of claim 63, wherein one of the plurality of modules is a dynamic memory including:
    a plurality of locally connected computational nodes, with feedforward inputs from another module,
    feedforward connectivity among the plurality of locally connected computational nodes using at least one feedforward re-entrant connection to the first of the plurality of locally connected computational nodes; and
    bi-directional connectivity between the modules.

67. The method of claim 63, wherein the plurality of modules have standardized dimensions and numbers of the plurality of locally connected computational nodes, wherein random connectivity among neighboring modules permits leaky processing.

68. The method of claim 63, wherein the plurality of modules provide converging and diverging connections from the at least one output of one module to another module.

69. The method of claim 63, wherein each module includes at least one of a logic gate, a NAND gate, and a CNOT gate.

70. An apparatus for implicit computation comprising:
    a of a neural network architecture means including:
        an input means from an environment capable of rendering a stable transformable digital representation of the environment; an output means; and,
        a plurality of locally connected computation nodes, each of the plurality of computation nodes being implemented as a software process on a general purpose computer or by a digital or analog hardware device, wherein the plurality of locally connected computation nodes is organized to perform fractal percolation using said stable transformable digital representations, wherein a minimalization step is used for computation.

71. The apparatus of claim 70, wherein the plurality of locally connected computation nodes has a state space of dimension of at least or equal to two.

72. The apparatus of claim 70, wherein the plurality of locally connected computation nodes has a Hilbert state space.

73. The apparatus of claim 70, wherein the plurality of locally connected computation nodes include Rydberg atoms.

74. The apparatus of claim 70, wherein the plurality of locally connected computation nodes include molecular magnets.

75. The apparatus of claim 70, wherein the local connection means among the plurality of locally connected computation nodes extend beyond nearest neighbors.

76. The apparatus of claim 70, wherein connection means connecting plurality of locally connected computation nodes are all feedforward, leading to "first-pass" percolation.

77. The apparatus of claim 70, wherein at least one connection means connecting the plurality of locally connected computation nodes is an inhibitory connection means.

78. The apparatus of claim 70, wherein the fractal percolation across the plurality of locally connected computation nodes occurs by any one of a Polya process, Bose-Einstein condensation, a Poisson process, a non-stationary random process, nearest-neighbor renormalization, and a random process.

79. The apparatus of claim 70, wherein the fractal percolation across the plurality of locally connected computation nodes occurs across an Ising lattice.

80. The apparatus of claim 70, wherein the plurality of locally connected computation nodes includes at least one laser.

81. The apparatus of claim 70, wherein the minimalization step user re-scaled weights among the plurality of locally connected computation nodes.

82. The apparatus of claim 70, wherein the minimalization step is performed by one of electron spin resonance pulses, quantum measurement, re-entrant connection means to the plurality of locally connected computation nodes and coherent radiation.

83. The apparatus of claim 70, wherein the plurality of locally connected computational nodes is one module means in an architecture with a plurality of module means.

84. The apparatus of claim 83, wherein one of the plurality of module means is an attention module means using bi-directional connection means to connect with another module means.

85. The apparatus of claim 83, wherein one of the plurality of module means is a standard digital memory means.

86. The apparatus of claim 83, wherein one of the plurality of modules is a dynamic memory using a plurality of locally connected computational nodes, and further including:
    feedforward input means from the output means of a remainder of the module means;
    feedforward connectivity means among the plurality of locally connected computational nodes; at least one feedforward re-entrant connection means to a first of the plurality of locally connected computational nodes, bi-directional connectivity means between the module means and both the plurality of locally connected computational nodes and the remainder of the plurality of module means.

87. The apparatus of claim 83, wherein the plurality of module means have standardized dimensions and standardized numbers of the plurality of locally connected computational nodes, the computational nodes using random connectivity means to connect to neighboring members of the plurality of module means to permit leaky processing.

88. The apparatus of claim 83, wherein the plurality of module means provide converging and diverging connection means from one output means of the plurality of module means to at least one other module means.

89. The apparatus of claim 83, wherein each module means includes one of a logic gate, a NAND gate, and a CNOT gate.

90. The apparatus of claim 70, further comprising:
   storage means for copying values for critical probabilities for a lattice formed by the computational nodes from the neural network architecture; and
   transfer means to write the values to another neural network means.

91. A system comprising:
   a plurality of computational nodes, wherein each computational node is implemented as a software process on a general purpose computer or by a digital or analog hardware device, each computational node comprising a local update process which transforms data received by the computational node wherein,
   a first subset of the plurality of computational nodes is organized into at least one feedforward input channel operatively connected to an input digital or analog data source;
   a second subset of the plurality of computational nodes organized into a plurality of processing layers having full lateral and feedback connections between the plurality of processing layers, at least one of the second subset of the plurality of computational nodes operatively being connected at least one of the first subset of the plurality of computational nodes;
   a third subset of the plurality of computational nodes organized into at least one output channel operatively connected to a data storage device or network, at least one of the third subset of the plurality of computational nodes operatively being operatively connected to at least one of the second subset of the plurality of computational nodes comprising at least one re-entrant feedback channel,
   wherein the feedforward input channel receives data from the external data source and transforms the data to a digital format and distributes the data in the digital format to at least one of second subset of the plurality of computational nodes,
   wherein the data in the digital format is processed by the plurality of processing layers using the local update processes of the nodes comprising plurality of processing layers, using the full lateral and feedback connections within the processing layers and using re-entrant feedback from the re-entrant feedback channel such that the data in the digital format is combined and minimalized, and
   wherein the combined data is output by the at least one output channel to the data storage device or network.

* * * * *